(12) United States Patent
Kitamura et al.

(10) Patent No.: US 11,516,229 B2
(45) Date of Patent: *Nov. 29, 2022

(54) CONTROL DEVICE AND CONTROL SYSTEM

(71) Applicant: OMRON Corporation, Kyoto (JP)

(72) Inventors: Yasuhiro Kitamura, Kusatsu (JP); Yoichi Kurokawa, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 152 days.

This patent is subject to a terminal disclaimer.

(21) Appl. No.: 16/642,357

(22) PCT Filed: Nov. 1, 2018

(86) PCT No.: PCT/JP2018/040653
§ 371 (c)(1),
(2) Date: Feb. 26, 2020

(87) PCT Pub. No.: WO2019/102811
PCT Pub. Date: May 31, 2019

(65) Prior Publication Data
US 2021/0075801 A1    Mar. 11, 2021

(30) Foreign Application Priority Data

Nov. 24, 2017   (JP) .............................. JP2017-226145

(51) Int. Cl.
*H04L 29/06*    (2006.01)
*H04L 9/40*    (2022.01)
*G05B 19/048*    (2006.01)

(52) U.S. Cl.
CPC ........ *H04L 63/1416* (2013.01); *G05B 19/048* (2013.01); *H04L 63/0236* (2013.01); *H04L 63/1425* (2013.01); *H04L 63/20* (2013.01)

(58) Field of Classification Search
CPC ............ H04L 63/1416; H04L 63/0236; H04L 63/1425; H04L 63/20; H04L 63/101;
(Continued)

(56) References Cited

U.S. PATENT DOCUMENTS 6,697,355 B1 * 2/2004 Lim .................... H04L 61/5084
455/433
9,038,151 B1 * 5/2015 Chua ...................... H04L 47/10
726/1
(Continued)

FOREIGN PATENT DOCUMENTS

CN    1601429 A    3/2005
CN    1719780 A    1/2006
(Continued)

OTHER PUBLICATIONS

English translation of the International Search Report("ISR") of PCT/JP2018/040653 dated Jan. 15, 2019.
(Continued)

*Primary Examiner* — John B King
(74) *Attorney, Agent, or Firm* — Metrolex IP Law Group, PLLC

(57) ABSTRACT

A control device includes: a program execution module that executes a program created depending on a control target; a detection module that determines whether a security event occurs in access from outside to the control device; and a notification module that provides a notification, upon detection of occurrence of the security event, to a notification destination corresponding to the occurred security event. The security event includes an event that does not conform to a predetermined rule.

16 Claims, 17 Drawing Sheets

(58) Field of Classification Search
CPC . H04L 63/1408; G05B 19/048; G05B 19/058; G06F 21/554

See application file for complete search history.

(56) References Cited

U.S. PATENT DOCUMENTS

| | | | | |
|---|---|---|---|---|
| 9,367,355 | B1* | 6/2016 | Schillings | G06F 9/5027 |
| 9,697,355 | B1* | 7/2017 | Park | G06F 21/554 |
| 9,998,426 | B2* | 6/2018 | Fischer | H04L 63/0263 |
| 10,547,634 | B2* | 1/2020 | Houmb | H04L 63/145 |
| 2005/0005110 | A1* | 1/2005 | Kim | H04L 63/101 713/166 |
| 2005/0182967 | A1* | 8/2005 | Phillips | H04L 63/1433 726/5 |
| 2006/0075264 | A1* | 4/2006 | Willman | G06F 21/577 714/E11.207 |
| 2006/0161445 | A1* | 7/2006 | Frank | G06F 21/10 726/17 |
| 2006/0250966 | A1* | 11/2006 | Su | H04L 63/101 370/248 |
| 2009/0064308 | A1* | 3/2009 | Komatsu | H04L 63/029 709/249 |
| 2009/0217353 | A1* | 8/2009 | Zheng | H04L 63/101 707/999.1 |
| 2010/0235914 | A1* | 9/2010 | Proulx | H04L 41/12 726/23 |
| 2014/0018958 | A1 | 1/2014 | Ueno et al. | |
| 2014/0165143 | A1* | 6/2014 | Keeni | H04L 63/101 726/3 |
| 2014/0181295 | A1* | 6/2014 | Hindawi | H04L 67/104 709/224 |
| 2014/0245451 | A1 | 8/2014 | Le Sant | |
| 2014/0258526 | A1 | 9/2014 | Le Sant et al. | |
| 2014/0277597 | A1 | 9/2014 | Le Sant et al. | |
| 2014/0309757 | A1 | 10/2014 | Le Sant et al. | |
| 2015/0295944 | A1 | 10/2015 | Yunoki et al. | |
| 2016/0196454 | A1* | 7/2016 | Soffer | H01R 13/7175 726/16 |
| 2017/0075336 | A1 | 3/2017 | Ueda | |
| 2017/0104770 | A1* | 4/2017 | Jreij | H04L 63/1416 |
| 2017/0176530 | A1* | 6/2017 | Cottrell | G01R 31/3177 |
| 2017/0250956 | A1* | 8/2017 | Yajnik | H04L 63/1416 |
| 2017/0374027 | A1* | 12/2017 | Fischer | H04L 63/0263 |

FOREIGN PATENT DOCUMENTS

| | | | | |
|---|---|---|---|---|
| CN | 101887257 | A | 11/2010 | |
| CN | 102204170 | A * | 9/2011 | ......... H04L 63/1425 |
| CN | 103543685 | A | 1/2014 | |
| CN | 104570822 | A | 4/2015 | |
| CN | 106411578 | A | 2/2017 | |
| CN | 106572103 | B * | 12/2019 | ............ H04L 49/35 |
| EP | 2866407 | A1 | 4/2015 | |
| EP | 3179323 | A1 * | 6/2017 | |
| EP | 3190769 | A1 * | 7/2017 | ......... H04L 63/1425 |
| EP | 3907969 | A1 * | 11/2021 | ......... H04L 41/0816 |
| FR | 2793047 | A1 * | 11/2000 | ......... G05B 19/0421 |
| JP | 2000-137506 | A | 5/2000 | |
| JP | 2003-108222 | A | 4/2003 | |
| JP | 2005-080024 | A | 3/2005 | |
| JP | 2006-163509 | A | 6/2006 | |
| JP | 2008-160587 | A | 7/2008 | |
| JP | 2009-110453 | A | 5/2009 | |
| JP | 2012-123840 | A | 6/2012 | |
| JP | 2013-030826 | A | 2/2013 | |
| JP | 2013-088887 | A | 5/2013 | |
| JP | 2014-531087 | A | 11/2014 | |
| JP | 2015-176369 | A | 10/2015 | |
| JP | 2017-103677 | A | 6/2017 | |
| WO | 96/27155 | A2 | 9/1996 | |
| WO | 2015/001594 | A1 | 1/2015 | |
| WO | 2017090045 | A1 | 6/2017 | |

OTHER PUBLICATIONS

Written Opinion("WO") of PCT/JP2018/040653 dated Jan. 15, 2019.
Extended European search report (EESR) dated Jun. 28, 2021 in a counterpart European patent application.
Chinese Office Action dated Aug. 24, 2022 in a counterpart Chinese patent application.
Joel Langill, "Why SCADA Firewalls Need to be Stateful -Part 3 of 3", May 9, 2012 (Retrieved on Jul. 9, 2022) Tofino Security, URL:https://www.tofinosecurity.com/blog/why-scada-firewalls-need-be-stateful-%E2%80%93-part-3-3; Cited in the Communication issued on Sep. 13, 2022 in a counterpart European patent application.
Chinese Office Action dated Sep. 2, 2022 in a counterpart Chinese patent application.
The Communication pursuant to Article 94(3) EPC dated Sep. 13, 2022 in a counterpart European patent application.

* cited by examiner

FIG.5

WHITE LIST                    BLACK LIST (A)         • 192.1.0.*                    • 192.1.2.255
            • 192.1.1.*                    • 192.168.0.0
               ...

(B)         • 90:00:4E:88:KE:3C            • 80:OK:NC:GW:HY:20
            • 80:ED:0F:WK:CP:CQ            • 76:5B:EQ:4E:7O:W9
               ...                            ...

(C)         • Port 80                      • Port 22
            • Port 8080                    • Port 23
            • Port 989                        ...
            • Port 990
               ...

FIG.6
(A)
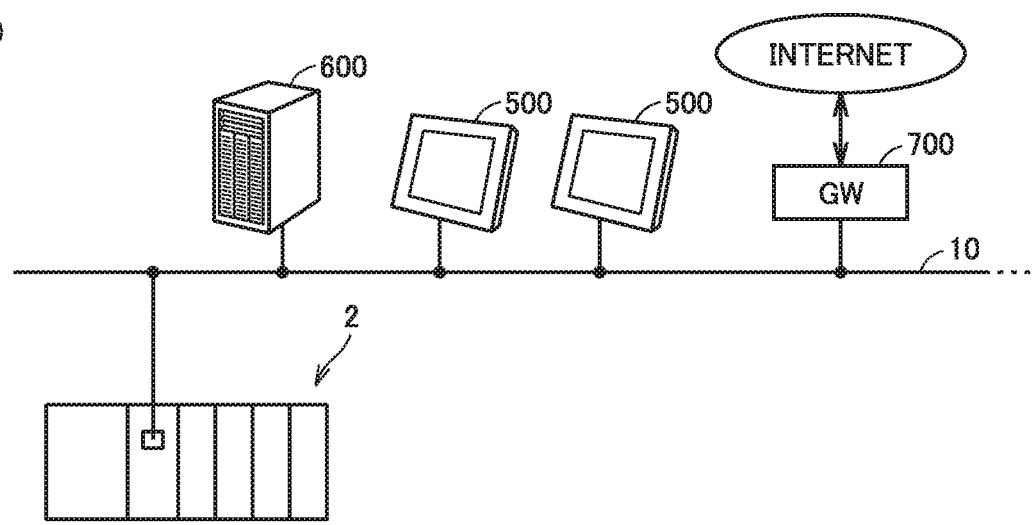
(B)
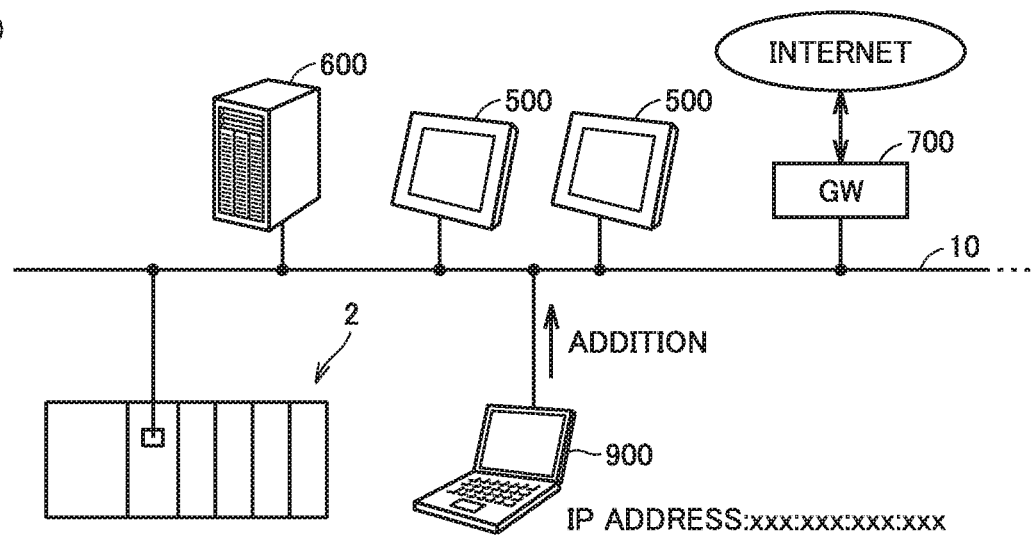

CONTROL DEVICE AND CONTROL SYSTEM

TECHNICAL FIELD

The present invention relates to security monitoring in a control device and a control system that control a control target.

BACKGROUND ART

To control various facilities and various apparatuses arranged at each facility, control devices such as a PLC (programmable controller) are used. A control device can monitor an abnormality which may occur in a facility or an apparatus serving as a control target, and can also monitor an abnormality of the control device itself. When a certain abnormality is detected, a notification is provided from the control device to the outside by a certain method.

For example, Japanese Patent Laying-Open No. 2000-137506 (PTL 1) discloses a programmable controller that transmits an e-mail to a destination specified beforehand, when an abnormality history is registered or when a predetermined time is reached.

CITATION LIST

Patent Literature

PTL 1: Japanese Patent Laying-Open No. 2000-137506

SUMMARY OF INVENTION

Technical Problem

With the progress of information and communication technology (ICT) in recent years, a control device is network-connected to various external devices, and processing performed in the control device also becomes sophisticated. With the advance of such networking or incorporation of intelligence, the types of assumed threats also increase.

In a conventional control device, only an abnormality which occurs in a facility or an apparatus, or an abnormality which occurs in the control device itself is detected, and a threat which may occur with the advance of networking or incorporation of intelligence is not assumed at all.

One object of the present invention is to solve a new problem of protection against a threat which may occur with the advance of networking of or incorporation of intelligence into a control device and a control system.

Solution to Problem

According to an example of the present disclosure, a control device that controls a control target is provided. The control device includes: a program execution module that executes a program created depending on the control target; a detection module that determines whether a security event occurs in access from outside to the control device; and a notification module that provides a notification, upon detection of occurrence of the security event, to a notification destination corresponding to the occurred security event. The security event includes an event that does not conform to a predetermined rule.

According to the disclosure, occurrence of a security event in the access from the outside to the control device can be monitored, and, when a certain security event occurs, a notification of occurrence, a notification required for handling the occurred event, and/or the like thereof is/are provided. This can solve a new problem of protection against a threat which may occur with the advance of networking of or incorporation of intelligence into the control device.

In the above disclosure, the security event may include any of: a behavior and an action that halt operation of the control device and/or degrade performance of the control device; a behavior and an action that halt processing for executing the program and/or degrade performance of the program in the control device; and a behavior and an action that halt operation of the control target and/or degrade performance of the control target.

According to the disclosure, a threat that processing provided by the control device may be inhibited can be monitored as a security event.

In the above disclosure, the security event may include that any of a network address, a physical address, and a port number of a data transmission destination and/or a data transmission source is not included in a predetermined list for permitted access, or is included in a predetermined list for prohibited access.

According to the disclosure, only data communication with a predetermined transmission destination or transmission source is permitted, and data communication other than that is detected as a security event. Accordingly, protection against a threat through a network can be achieved.

In the above disclosure, the control device includes a first unit including the program execution module, and a second unit including the detection module. The first unit has a port for network connection. The security event may include that, when the port of the first unit is disabled, the port is network-connected.

According to the disclosure, such a threat can be detected as a security event at a stage before an attack through the network or an improper measure through the network is performed on the control device.

In the above disclosure, the security event includes that user authentication required when accessing the control device from the outside fails.

According to the disclosure, since a failure in user authentication suggests unauthorized access, such a threat can be detected as a security event at a stage before such unauthorized access is made.

In the above disclosure, the security event includes that a support device capable of developing the program to be executed in the control device is connected to the control device.

According to the disclosure, although an attack with a certain evil intention may be performed on the program to be executed when the support device capable of changing the program itself of the control device is directly connected, such a threat can be detected as a security event at a prior stage.

In the above disclosure, the security event includes that any of addition and change of the program to be executed in the control device and change of setting in the control device occurs.

According to the disclosure, when modification to the program to be executed in the control device or modification to the setting required for the control device to operate is made, such modification can be detected as a security event. Although such modification to the program or the setting may cause execution of abnormal control operation in the control device, such a threat can be prevented in advance.

In the above disclosure, the notification module may provide an event notification about occurrence of the security event through a network.

According to the disclosure, an arbitrary device which is network-connected with the control device can be notified of occurrence of a security event indicating a threat against the control device.

In the above disclosure, an alert unit arranged on the network may start alert operation upon receiving the event notification from the notification module.

According to the disclosure, for example, when the alert module arranged in the vicinity of the control device starts alert operation, an administrator, a maintenance staff member, or the like in the vicinity of the control device notices occurrence of a security event, and can immediately start a required measure.

According to an example of the present disclosure, a control system that controls a control target is provided. The control system includes: a first unit including a program execution module that executes a program created depending on the control target; and a second unit including a detection module that determines whether a security event occurs in access from outside to the first unit, and a notification module that provides a notification, upon detection of occurrence of the security event, to a notification destination corresponding to the occurred security event. The security event includes an event that does not conform to a predetermined rule.

According to the disclosure, occurrence of a security event in the access from the outside to the control system can be monitored, and, when a certain security event occurs, a notification of occurrence, a notification required for handling the occurred event, and/or the like thereof is/are provided. This can solve a new problem of protection against a threat which may occur with the advance of networking of or incorporation of intelligence into the control system.

Advantageous Effects of Invention

According to the present invention, protection against a threat which may occur with the advance of networking of or incorporation of intelligence into a control device and a control system can be achieved.

BRIEF DESCRIPTION OF DRAWINGS

FIG. 5 is a diagram showing an example of an access control list (ACL) included in security setting.

FIG. 6 is a schematic diagram showing an example of a node change in a network.

DESCRIPTION OF EMBODIMENTS

Figure 1:
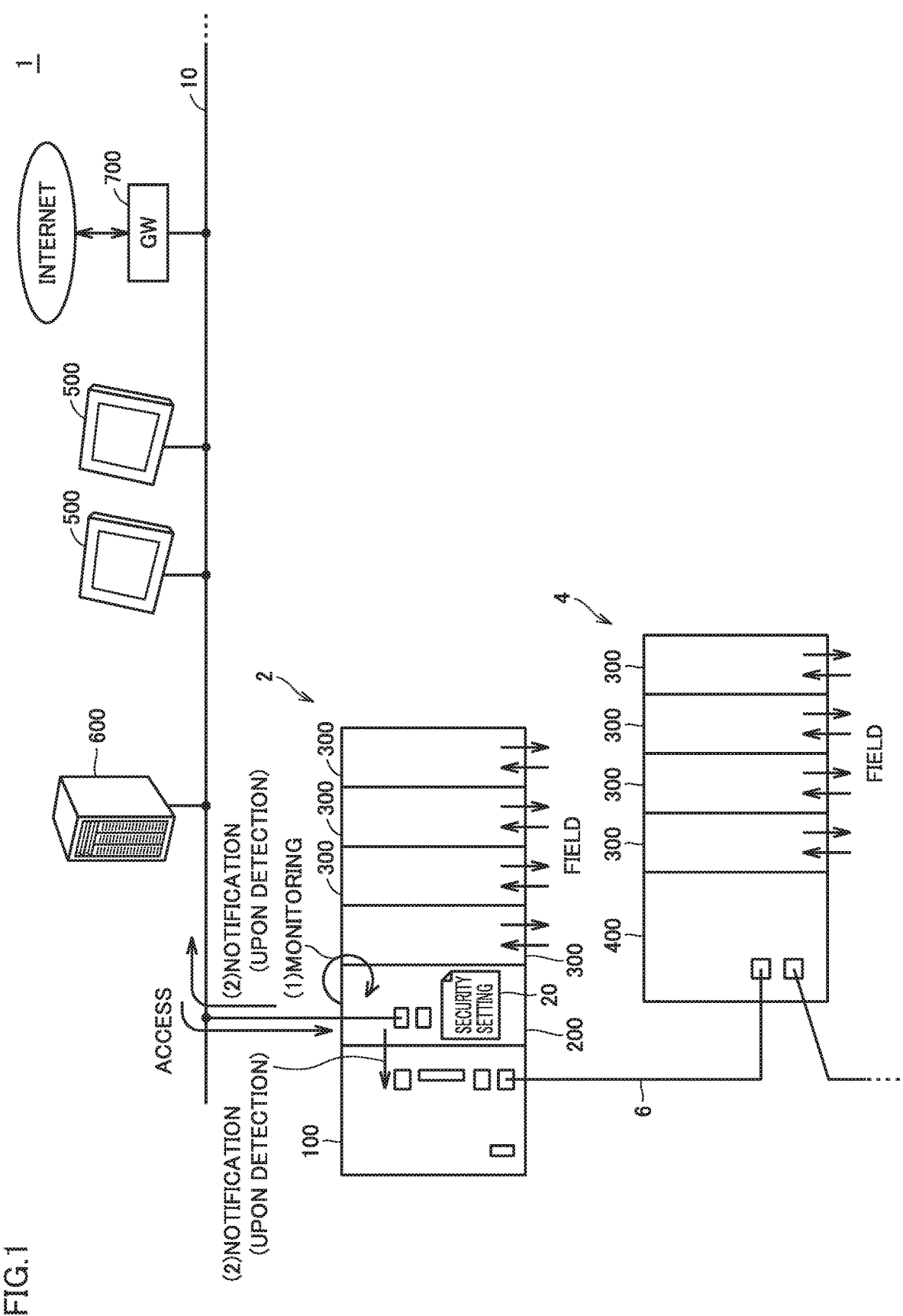
FIG. 1 is a schematic diagram showing a schematic configuration of a control system in accordance with the present embodiment.

An embodiment of the present invention will be described in detail with reference to the drawings. It should be noted that identical or corresponding parts in the drawings will be designated by the same reference numerals, and the description thereof will not be repeated.

A. Application Example

First, an example of a scene to which the present invention is applied will be described.

In the present specification, a "security event" includes an event that does not conform to a rule predetermined by an operator or an administrator of a control device, or the like. More specifically, the "security event" can include (a) a behavior and an action that halt operation of the control device and/or degrade performance of the control device itself, (b) a behavior and an action that halt processing for executing a program and/or degrade performance of the program in the control device, (c) a behavior and an action that halt operation of a facility, an apparatus, a device, or the like and/or degrade performance of the facility, the apparatus, the device, or the like, which serves as a control target of the control device, and (d) a behavior and an action similar thereto.

The "security event" in the present specification is basically a concept that includes a behavior or an action provided through a network or electrical communication similar thereto.

FIG. 1 is a schematic diagram showing a schematic configuration of a control system 1 in accordance with the present embodiment. Referring to FIG. 1, control system 1 in accordance with the present embodiment is intended to control a control target such as a facility, an apparatus, and the like, and includes a control device 2, a remote input output (IO) device 4, one or a plurality of display devices 500, and one or a plurality of server devices 600. Control device 2, display devices 500, and server device 600 are connected through a network 10. Network 10 is connected to the Internet, which is an external network, through a gateway 700. In addition, control device 2 and remote IO device 4 are connected through a field network 6.

Control device 2 is mainly in charge of processing for controlling a control target. In the present embodiment, control device 2 monitors access from the Internet and access from other devices in network 10, and when control device 2 detects occurrence of a certain security event, control device 2 provides a notification about the detected security event to the inside or the outside of control device 2.

Control device 2 includes a CPU unit 100, a security unit 200, and one or a plurality of functional units 300. CPU unit 100 has a program execution module that executes a program created depending on a control target. More specifically, CPU unit 100 corresponds to a computation processing portion that executes a system program and various user programs.

Security unit 200 has a detection module that determines whether a security event occurs in access from the outside to control device 2. More specifically, security unit 200 constantly monitors whether a security event occurs, in accordance with predetermined security setting 20. In the exemplary configuration shown in FIG. 1, security unit 200 is arranged such that it can monitor data transmitted/received by control device 2 through network 10. That is, security unit 200 is logically arranged between CPU unit 100 and network 10, transfers data transmitted from CPU unit 100 to network 10, and transfers data received through network 10 to CPU unit 100. Security unit 200 monitors the data transmitted/received in such processing, and determines the presence or absence of a certain security event.

Upon detection of occurrence of a certain security event, security unit 200 provides a notification to the inside or the outside in accordance with a predetermined rule. That is, security unit 200 has a notification module that provides a notification, upon detection of occurrence of the security event, to a notification destination corresponding to the occurred security event.

Control system 1 in accordance with the present embodiment implements processing for constantly monitoring whether a predetermined security event occurs in access to CPU unit 100 or a device including CPU unit 100. Then, when a certain security event occurs, a notification corresponding to the occurred security event is output to the inside or the outside of control device 2. By adopting such a configuration, security resistance for CPU unit 100 or the device including CPU unit 100 can be increased.

It should be noted that, although an example of separate-type implementation using respectively independent CPU unit 100 and security unit 200 is shown for convenience of description, implementation is not limited thereto, and a unit including the both units integrated with each other may be adopted. Alternatively, processing provided by security unit 200 may be implemented as a separate device connected to CPU unit 100 via certain means, instead of taking the form of a "unit" connected to CPU unit 100.

B. Exemplary Overall Configuration of Control System

Continuously referring to FIG. 1, an exemplary overall configuration of control system 1 will be described.

Functional units 300 included in control device 2 exchange signals with a facility and an apparatus serving as control targets, and various devices (such as a sensor, an actuator, and the like) arranged therein. Specifically, functional unit 300 outputs a command value calculated in CPU unit 100 to a field, or collects an input value from the field. Functional unit 300 has one or a plurality of modules, among a digital input (DI) module that receives a digital signal from a control target, a digital output (DO) module that outputs a digital signal to the control target, an analog input (AI) module that receives an analog signal from the control target, and an analog output (AO) module that outputs an analog signal to the control target, for example. Further, functional unit 300 can include a controller that implements a special function such as proportional integral derivative (PID) control and motion control.

As field network 6 that connects control device 2 and remote IO device 4, it is preferable to adopt a bus or a network that performs fixed-cycle communication which ensures data arrival time. As the bus or the network that performs such fixed-cycle communication, EtherCAT (trademark) may be adopted. It should be noted that a communication path called a "field network" is also called a "field bus". In the present specification, the term "field network" is used as a concept that can include the "field bus", in addition to the "field network" in a narrow sense.

Remote IO device 4 includes a coupler unit 400 and one or a plurality of functional units 300. Coupler unit 400 includes a first communication interface for exchanging data through field network 6, and a second communication interface for internally exchanging data with functional units 300 included in remote IO device 4.

Since functional units 300 are the same as functional units 300 included in control device 2, the detailed description thereof will not be repeated.

As network 10 that connects control device 2 to display devices 500 and server device 600, for example, Ethernet (trademark) or EtherNet/IP (trademark), which are common network protocols, may be adopted.

Display device 500 receives an operation from a user, outputs a command or the like in accordance with the user operation to control device 2, and graphically displays a computation result or the like in control device 2.

As server device 600, a database system, a manufacturing execution system (MES), or the like is assumed. The manufacturing execution system is intended to acquire information from a manufacturing apparatus or facility serving as a control target, and monitor and manage entire production, and can also handle order information, quality information, shipment information, and the like. Server device 600 is not limited thereto, and a device that provides an information-related service (processing for acquiring a variety of information from a control target and conducting macroscopic or microscopic analysis or the like) may be connected to network 10.

Gateway 700 performs processing as protocol conversion and a firewall between network 10 and the external network (the Internet).

C. Exemplary Hardware Configurations of Main Units

Next, exemplary hardware configurations of main units included in control device 2 in accordance with the present embodiment will be described.

(c1: CPU Unit 100)

Figure 2:
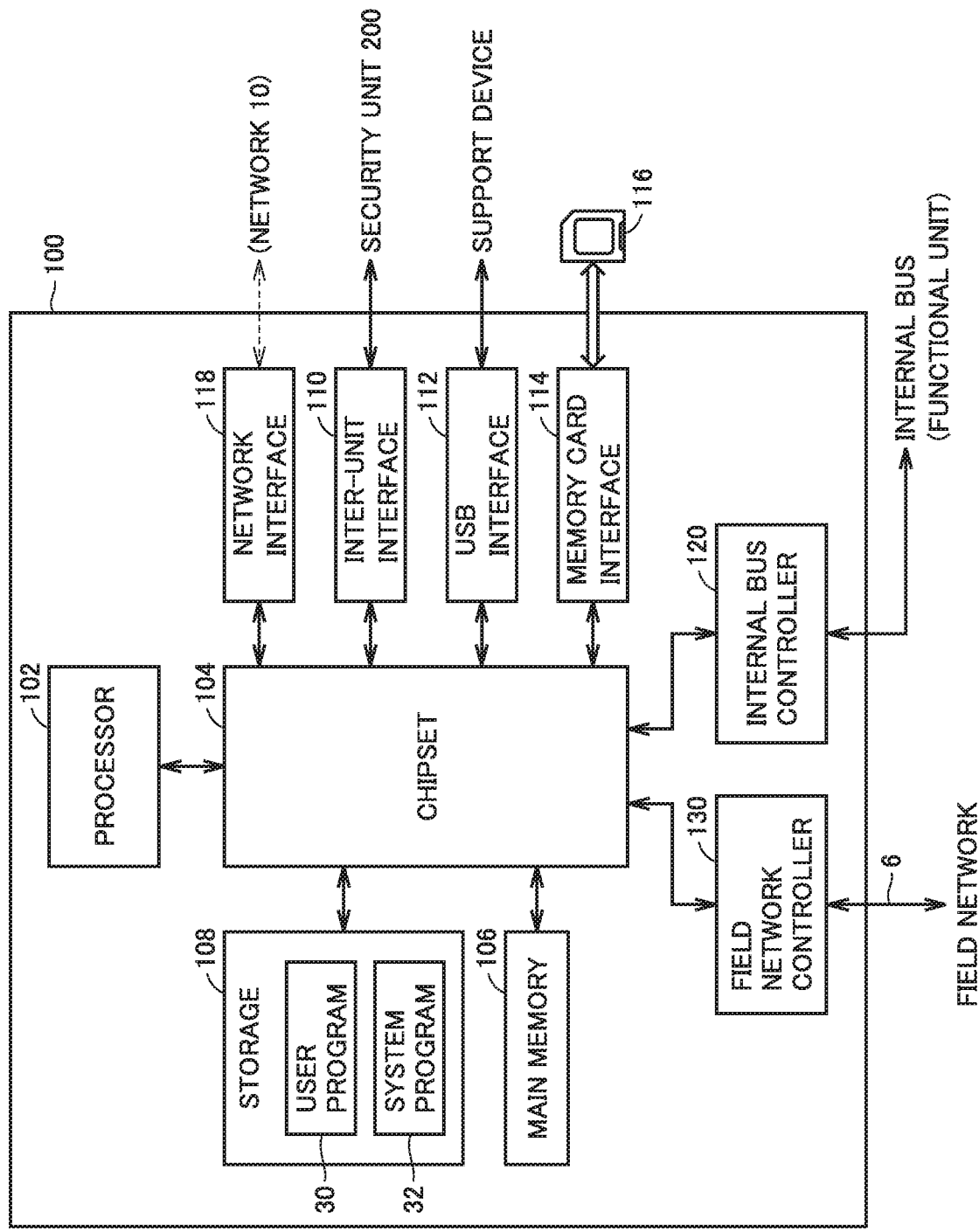
FIG. 2 is a block diagram showing an exemplary hardware configuration of a CPU unit included in a control device in accordance with the present embodiment.

FIG. 2 is a block diagram showing an exemplary hardware configuration of CPU unit 100 included in control device 2 in accordance with the present embodiment. Referring to FIG. 2, CPU unit 100 includes a processor 102, a chipset 104, a main memory 106, a storage 108, an inter-unit interface 110, a universal serial bus (USB) interface 112, a memory card interface 114, a network interface 118, an internal bus controller 120, and a field network controller 130.

Processor 102 is constituted by a central processing unit (CPU), a micro processing unit (MPU), a graphics processing unit (GPU), or the like. As processor 102, a configuration having a plurality of cores may be adopted, or a plurality of processors 102 may be arranged. Thus, CPU unit 100 has one or a plurality of processors 102, and/or processor 102 having one or a plurality of cores. Chipset 104 controls processor 102 and peripheral elements, and thereby achieves processing as entire CPU unit 100. Main memory 106 is constituted by a volatile storage device such as a dynamic random access memory (DRAM) or a static random access memory (SRAM), or the like. Storage 108 is constituted by a nonvolatile storage device such as a flash memory, for example.

Processor 102 reads various programs stored in storage 108, deploys and executes them in main memory 106, and thereby achieves control depending on a control target. Storage 108 stores a user program 30 created depending on a manufacturing apparatus or facility serving as a control target, in addition to a system program 32 for achieving basic processing.

Inter-unit interface 110 is a device for connecting to another unit to allow data communication. In the present embodiment, security unit 200 is connected through inter-unit interface 110 of CPU unit 100. As inter-unit interface 110, for example, a device conforming to a known data transmission standard (for example, PCI Express) or the like can be adopted.

USB interface 112 mediates data communication with an external device (for example, a support device that performs development of the user program and the like) through USB connection.

Memory card interface 114 is configured such that a memory card 116 is removably attached thereto, and can write data to memory card 116 and read various types of data (such as the user program, trace data, and the like) from memory card 116.

Network interface 118 can mediate data communication through network 10. However, in a state where security unit 200 is connected to CPU unit 100, generally, operation of network interface 118 is disabled (specifically, use of a port is prohibited).

Internal bus controller 120 mediates data communication with functional unit 300 mounted on CPU unit 100. Field network controller 130 mediates data communication with another unit through field network 6.

Although FIG. 2 shows an exemplary configuration in which required processing is achieved by processor 102 executing a program, the provided processing may be partially or entirely implemented using a dedicated hardware circuit (such as an ASIC or an FPGA, for example).

(c2: Security Unit 200)

Figure 3:
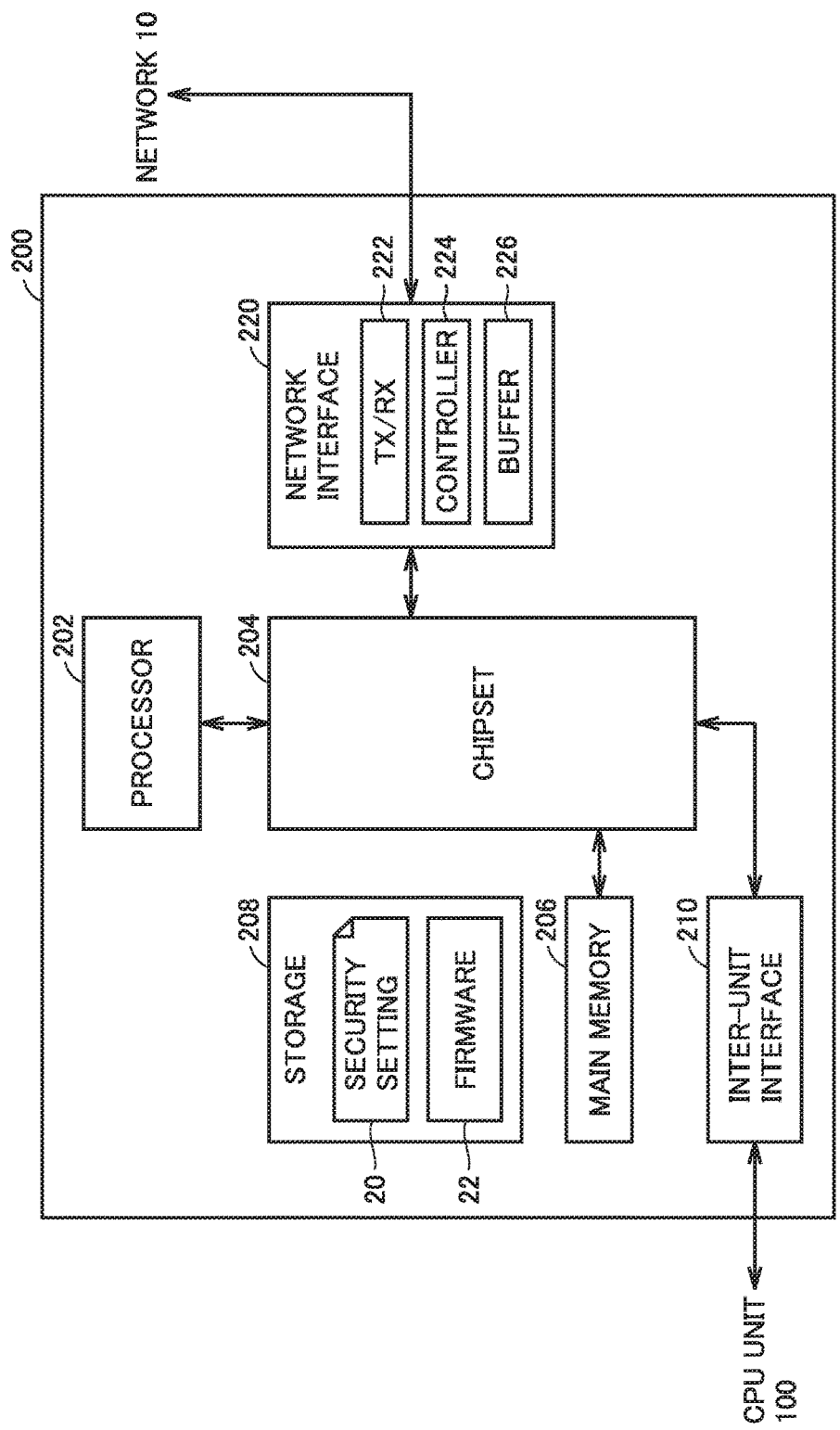
FIG. 3 is a block diagram showing an exemplary hardware configuration of a security unit included in the control device in accordance with the present embodiment.

FIG. 3 is a block diagram showing an exemplary hardware configuration of security unit 200 included in control device 2 in accordance with the present embodiment. Referring to FIG. 3, security unit 200 includes a processor 202, a chipset 204, a main memory 206, a storage 208, an inter-unit interface 210, and a network interface 220.

Processor 202 is constituted by a CPU, an MPU, a GPU, or the like. As with CPU unit 100 described above, security unit 200 has one or a plurality of processors 202, and/or processor 202 having one or a plurality of cores. Chipset 204 controls processor 202 and peripheral elements, and thereby achieves processing as entire security unit 200. Main memory 206 is constituted by a volatile storage device such as a DRAM or an SRAM, or the like. Storage 208 is constituted by a nonvolatile storage device such as a flash memory, for example.

Processor 202 reads various programs stored in storage 208, deploys and executes them in main memory 206, and thereby achieves processing such as monitoring of a security event. Storage 208 stores security setting 20 that defines a rule or the like predetermined by an operator or an administrator of the control device, or the like, in addition to firmware 22 for achieving basic processing. The details of security monitoring processing based on security setting 20 will be described later.

Inter-unit interface 210 is a device for connecting to another unit to allow data communication, as with inter-unit interface 110 of CPU unit 100 described above. Through inter-unit interface 210, security unit 200 is connected to CPU unit 100.

Network interface 220 mediates data communication with another device through network 10. Network interface 220 includes a transmission/reception portion 222, a controller 224, and a buffer 226, as main components.

Transmission/reception portion 222 is an element in charge of the physical layer of the OSI reference model, and takes charge of reception of a signal through network 10 and decoding thereof, encoding of data to be transmitted, and transmission of an encoded signal through network 10.

Controller 224 is an element mainly in charge of the data link layer, the network layer, and the transport layer of the OSI reference model, and takes charge of routing, error correction, retransmission processing, and the like.

Buffer 226 is a storage portion that temporarily stores data to be transmitted, received data, and the like.

Although FIG. 3 shows an exemplary configuration in which required processing is provided by processor 202 executing a program, the provided processing may be partially or entirely implemented using a dedicated hardware circuit (such as an ASIC or an FPGA, for example).

(c3: Functional Units 300 and Coupler Unit 400)

Since functional units 300 included in control device 2 and remote IO device 4 and coupler unit 400 included in remote IO device 4 in accordance with the present embodiment have known configurations, the detailed description thereof will not be repeated herein.

D. Exemplary Functional Configuration

Figure 4:
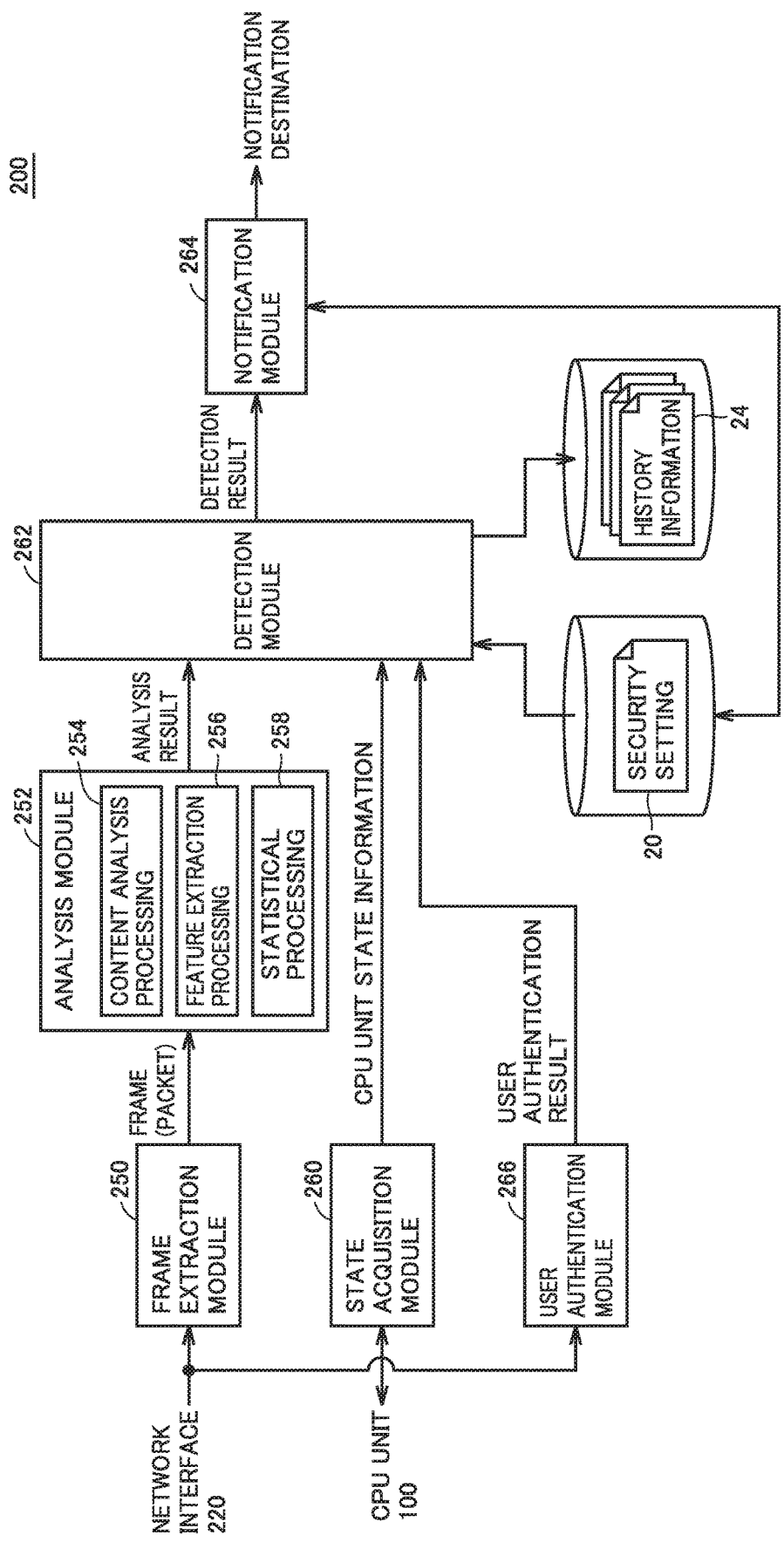
FIG. 4 is a block diagram showing an exemplary functional configuration of the security unit included in the control device in accordance with the present embodiment.

Next, an example of a functional configuration of security unit 200 included in control system 1 in accordance with the present embodiment will be described. FIG. 4 is a block diagram showing an exemplary functional configuration of security unit 200 included in control device 2 in accordance with the present embodiment.

Referring to FIG. 4, security unit 200 includes a frame extraction module 250, an analysis module 252, a state acquisition module 260, a detection module 262, a notification module 264, and a user authentication module 266, as a functional configuration related to monitoring of a security event.

Frame extraction module 250 extracts, from network interface 220, data (a frame or a packet) to be exchanged with an external device through network 10. Frame extraction module 250 outputs the extracted frame or packet to analysis module 252.

Analysis module 252 analyzes the frame or packet from frame extraction module 250, and outputs an analysis result thereof to detection module 262. The content of the analysis in analysis module 252 can be set arbitrarily. In the exemplary configuration shown in FIG. 4, analysis module 252 can perform content analysis processing 254, feature extraction processing 256, and statistical processing 258.

Content analysis processing 254 includes processing for acquiring information such as a network address (for example, an Internet Protocol (IP) address), a physical address (for example, a Media Access Control (MAC) address), a port number, or a transmission protocol of a transmission destination and a transmission source, with reference to header information in the frame or packet to be processed, or the like.

Feature extraction processing 256 includes processing for extracting a feature amount from the content of data included in the frame or packet to be processed.

Statistical processing 258 includes processing for calculating statistical information, such as transmission/reception timing and frequency of the frame or packet to be processed.

Information calculated by each processing is output, as the analysis result, to detection module 262.

State acquisition module 260 acquires the state in CPU unit 100, and outputs the acquired CPU unit state information to detection module 262. The CPU unit state information indicates, for example, a certain change operation performed on CPU unit 100 (both an operation on software and an operation on hardware can be included).

Detection module 262 refers to security setting 20, and determines whether the analysis result from analysis module 252 and/or the CPU unit state information from state acquisition module 260 match(es) a condition(s) for a predetermined security event. It should be noted that a specific example of the security event will be described later.

When the analysis result or the CPU unit state information matches any condition, detection module 262 determines that a security event of the type corresponding to the matched condition occurs, and outputs, to notification module 264, a detection result indicating occurrence of the detected security event.

Detection module 262 registers information indicating the detected security event as history information 24.

In response to the detection result from detection module 262, notification module 264 provides a notification including a content corresponding to the occurred security event, to a notification destination corresponding to the occurred security event. Specific examples of the content of the notification and the notification destination will be described later.

User authentication module 266 performs authentication processing on a user who accesses security unit 200 through network 10. User authentication module 266 outputs a user authentication result indicating the result of user authentication to detection module 262.

By adopting the functional configuration as described above, security monitoring processing in accordance with the present embodiment can be achieved.

E. Security Event

Next, some examples of the security event set in control system 1 in accordance with the present embodiment will be described.

(e1-1: Access Control)

First, a description will be given of an example of utilizing access control that limits transmission destinations and/or transmitting sources, as security setting 20.

As an example of access control, a network address (for example, an IP address), a physical address (for example, an MAC address), a port number, or the like of a transmission destination and/or a transmission source can be used.

FIG. 5 is a diagram showing an example of an access control list (ACL) included in security setting 20. FIG. 5 shows a white list that defines conditions for permitting access explicitly, and a black list that defines conditions for prohibiting access explicitly, as the access control list for achieving access control. However, it is not necessary to use these two types of lists, and only one of these may be used in accordance with the required security level or the like.

FIG. 5(A) shows an example using network addresses (IP addresses) of communication destinations. The white list in FIG. 5(A) defines IP addresses that are permitted to access CPU unit 100, and the black list in FIG. 5(A) defines IP addresses that are prohibited to access CPU unit 100.

FIG. 5(B) shows an example using physical addresses (MAC addresses) of communication destinations. The white list in FIG. 5(B) defines MAC addresses that are permitted to access CPU unit 100, and the black list in FIG. 5(B) defines MAC addresses that are prohibited to access CPU unit 100.

FIG. 5(C) shows an example using port numbers used for data communication with communication destinations. The white list in FIG. 5(C) defines port numbers that are permitted to access CPU unit 100, and the black list in FIG. 5(C) defines port numbers that are prohibited to access CPU unit 100.

When there is access from a device not defined in the white lists and there is access from a device defined in the black lists in FIG. 5(A) to FIG. 5(C), it may be determined that a security event occurs. Monitoring of a security event using such an access control list is typically achieved by comparing the access control list with the analysis result output by content analysis processing 254 of analysis module 252 shown in FIG. 4.

Some of the network address, the physical address, and the port number described above may be combined. For example, only a communication destination whose physical address and port number are both permitted to have access may be permitted to have access.

Thus, the security event in accordance with the present embodiment may include that any of a network address, a physical address, and a port number of a data transmission destination and/or a data transmission source is not included in a predetermined white list for permitted access, or is included in a predetermined black list for prohibited access.

(e1-2: Data Reception Pattern)

Next, a description will be given of an example of monitoring a data reception pattern as security setting 20. For example, security setting 20 for detecting a DoS (Denial of Service) attack that transmits a lot of request data and the like to make a service unavailable, or the like, may be adopted.

Considering a SYN flood attack or the like as an example of the DoS attack, such a case where SYN packets having a short reception interval (or packets having a size of a predetermined value or less) are continuously received over a predetermined period may be determined as a case where a security event occurs.

Monitoring of a security event using a data reception pattern is typically achieved by comparing the access control list with the feature amount output by feature extraction processing 256 of analysis module 252 shown in FIG. 4. Thus, a data reception pattern defined by the type and the reception interval of received packets and the like may be defined as security setting 20.

Thus, the security event in accordance with the present embodiment may include that the data reception pattern defined by the type and the reception interval of received packets and the like matches a predefined pattern.

(e1-3: Access Pattern)

Next, a description will be given of an example of monitoring a specific access pattern as security setting 20.

For example, for known computer viruses, specific access patterns are often clarified. In such a case, the specific access patterns may be defined as security setting 20. Then, when access corresponding to an access pattern defined in security setting 20 is received, it may be determined that a security event occurs.

Monitoring of a security event using such an access pattern is typically achieved by comparing the access control list with the feature amount output by feature extraction processing 256 of analysis module 252 shown in FIG. 4. Thus, monitoring of a specific access pattern may be defined as security setting 20.

Thus, the security event in accordance with the present embodiment may include that the pattern of access to control device 2 matches a predefined pattern.

(e2: Network Monitoring)

Next, a description will be given of an example of monitoring a node change in the network as security setting 20.

Generally, to the network to which control device 2 is connected, only predetermined devices (nodes) are connected, and a new device (node) is less likely to be added. Accordingly, a node change in the network can also be considered as a security event.

FIG. 6 is a schematic diagram showing an example of a node change in the network. Referring to FIG. 6(A), a state where, in addition to control device 2, display devices 500 and server device 600 are connected to network 10 is assumed as a standard node configuration. It is assumed that, to such a standard node configuration, a new device 900 is added, as shown in FIG. 6(B).

When such addition of device 900 causes a change in the nodes in network 10, it may be determined that a security event occurs.

Specifically, for example, a network address of each node in the standard node configuration is acquired beforehand as security setting 20. Then, when a network address different from those of the nodes acquired beforehand is detected in network 10, it can be determined that a node change in network 10 occurs. Alternatively, a node change may be detected based on a change in the number of nodes existing in network 10, or the like.

It should be noted that, as the node change in network 10, not only addition of a node but also removal of a node and the like may be detected. Further, as the node change in network 10, not only a change in the number of nodes but also a change in topology may be detected.

When such a node change in the network occurs, it may be determined that a security event occurs.

Thus, the security event in accordance with the present embodiment may include that a node change in the network occurs.

(e3-1: Monitoring of Connection to Network Port)

Next, a description will be given of an example of monitoring connection to a network port of CPU unit 100 as security setting 20.

In a configuration in which security unit 200 is connected to CPU unit 100, CPU unit 100 is connected to network 10 through security unit 200. Accordingly, use of the network port provided to CPU unit 100 itself is prohibited (network interface 118 shown in FIG. 2 is disabled).

When a certain network is connected to the network port of CPU unit 100 in such a state, it is assumed as an action with a certain intention. Accordingly, when network connection to such a disabled network port occurs, it may be determined that a security event occurs.

Figure 7:
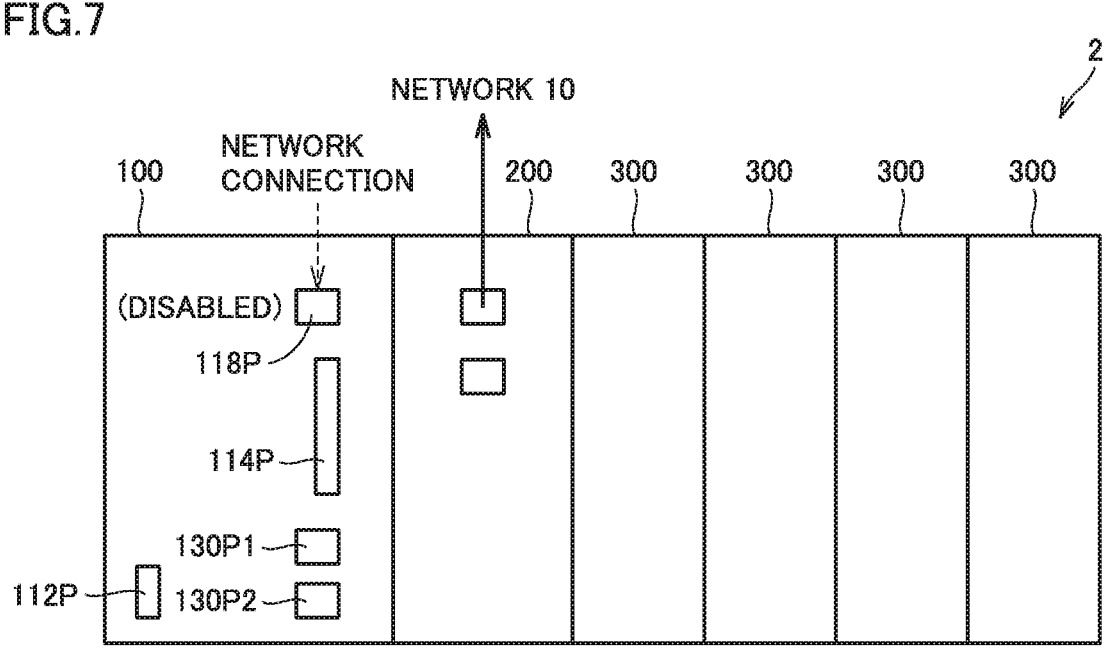
FIG. 7 is a schematic diagram illustrating monitoring of connection to a network port.

FIG. 7 is a schematic diagram illustrating monitoring of connection to the network port. Referring to FIG. 7, on the surface of CPU unit 100, a USB port 112P, a memory card slot 114P, a network port 118P, and field network ports 130P1 and 130P2 are arranged. Network port 118P is a port for network-connecting CPU unit 100.

It is assumed that unused network port 118P is disabled during operation of control device 2. When a cable is connected to network port 118P in such a state, it may be determined that a security event occurs. It should be noted that, since network connection may be established during a halt or maintenance of control device 2, the state that control device 2 is in operation may be added as a condition for determining that a security event occurs.

Such monitoring of connection to the network port is typically achieved by monitoring the CPU unit state information output by state acquisition module 260 shown in FIG. 4.

Thus, the security event in accordance with the present embodiment may include that, when network port 118P of CPU unit 100 is disabled, network port 118P is network-connected.

(e3-2: Monitoring of Connection to USB Port)

Next, a description will be given of an example of monitoring connection to the USB port of CPU unit 100 as security setting 20.

For example, a support device is connected through the USB port of CPU unit 100 or the like. Such connection of the support device is assumed as an action with a certain intention. Accordingly, when network connection to such a disabled network port occurs, it may be determined that a security event occurs.

Figure 8:
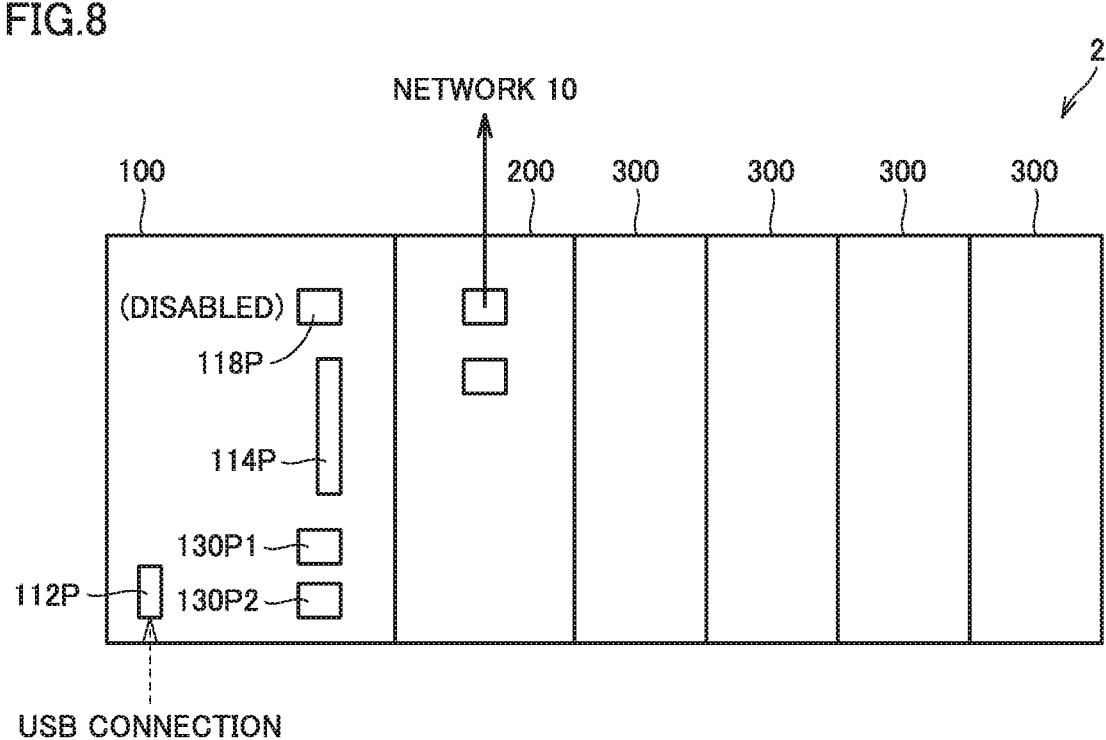
FIG. 8 is a schematic diagram illustrating monitoring of connection to a USB port.

FIG. 8 is a schematic diagram illustrating monitoring of connection to the USB port. Referring to FIG. 8, on the surface of CPU unit 100, USB port 112P, memory card slot 114P, network port 118P, and field network ports 130P1 and 130P2 are arranged.

For example, when a certain device is connected through USB port 112P during operation of control device 2, it may be determined that a security event occurs. It should be noted that, since the support device may be connected during a halt or maintenance of control device 2, the state that control device 2 is in operation may be added as a condition for determining that a security event occurs.

Such monitoring of connection to the USB port is typically achieved by monitoring the CPU unit state information output by state acquisition module 260 shown in FIG. 4.

Thus, the security event in accordance with the present embodiment may include that an arbitrary device is connected to USB port 112P. It should be noted that connection of an arbitrary device such as the support device through arbitrary communication means, instead of the USB port, may be considered as a security event. Accordingly, the security event typically includes that the support device capable of developing the program (user program 30) to be executed in control device 2 is connected to the control device.

(e3-3: Monitoring of Supplying Power)

Next, a description will be given of an example of monitoring a power supply state of control device 2 as security setting 20.

For example, when supplying power is turned on/off during operation of control device 2, it is assumed as an action with a certain intention. Accordingly, when supply power to control device 2 is turned on/off, it may be determined that a security event occurs.

It is also assumed that, in control device 2, power is supplied from a common power source to CPU unit 100 and security unit 200. In such a configuration, it is assumed that, when the power source is shut off, power supply to security unit 200 is also shut off.

In such a case, a battery or the like may be arranged inside security unit 200, and even when external power source is shut off, security monitoring may be continued using electric power from the battery.

Monitoring of the power supply state of control device 2 is typically achieved by monitoring the CPU unit state information output by state acquisition module 260 shown in FIG. 4.

Thus, the security event in accordance with the present embodiment may include that the power supply state of control device 2 changes.

(e3-4: Monitoring of Hard Switch)

Next, a description will be given of an example of monitoring the state of a hard switch provided to control device 2 as security setting 20.

For example, when a DIP switch (generally used to set an operation mode of CPU unit 100 or the like) provided to CPU unit 100 is operated during operation of control device 2, it is assumed as an action with a certain intention. Accordingly, when the hard switch (for example, the DIP switch) of CPU unit 100 is operated, it may be determined that a security event occurs.

It should be noted that examples of the hard switch of CPU unit 100 include not only the DIP switch, but also a rotary switch, a toggle switch, and the like.

Such monitoring of the state of the hard switch provided to control device 2 is typically achieved by monitoring the CPU unit state information output by state acquisition module 260 shown in FIG. 4.

Thus, the security event in accordance with the present embodiment may include that the state of the hard switch provided to control device 2 changes.

(e3-5: Monitoring of Ambient Environment)

Next, a description will be given of an example of monitoring an ambient environment of control device 2 as security setting 20.

Generally, control device 2 is accommodated in a control board or the like to have a temperature which is equal to or less than a predetermined upper limit temperature. However, when a suspicious person performs an action such as stopping a cooling fan for the control board, the temperature in the control board may increase. When such a change occurs in the ambient environment during operation of the control device, it may be determined that a security event occurs. As a specific example, if the maximum rating temperature is 55° C., when a temperature lower than that, for example 50° C., is reached, it may be determined that a security event occurs.

Such monitoring of the ambient environment of control device 2 is typically achieved by monitoring the CPU unit state information output by state acquisition module 260 shown in FIG. 4.

Thus, the security event in accordance with the present embodiment may include that the ambient environment of control device 2 satisfies a predetermined condition.

(e4-1: User Authentication: Part 1)

Next, a description will be given of an example of monitoring an authentication result of user authentication performed when accessing CPU unit 100 from the support device, as security setting 20.

Figure 9:
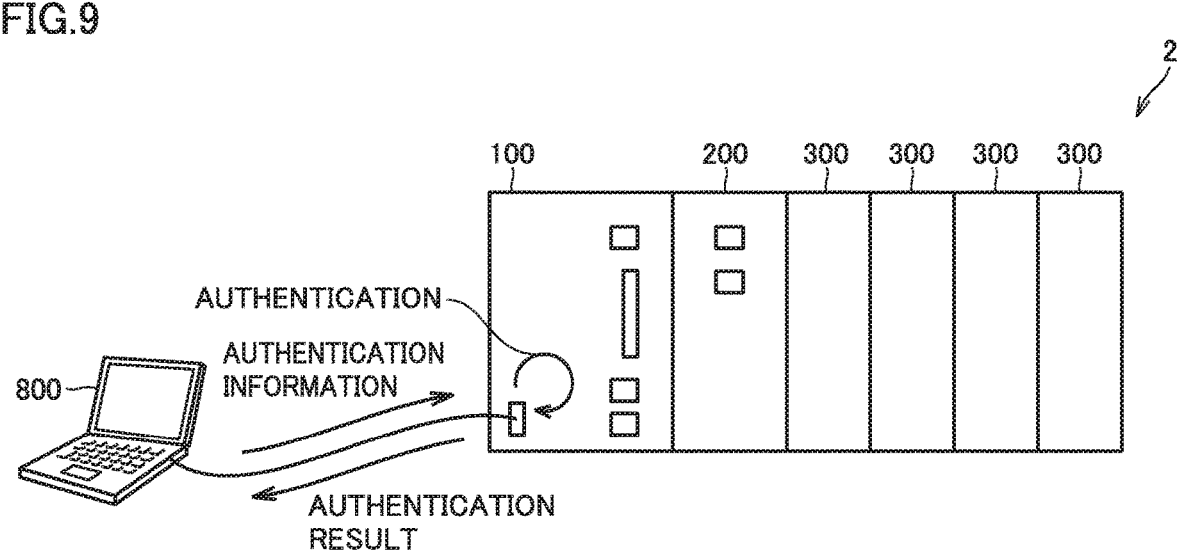
FIG. 9 is a schematic diagram for illustrating processing when accessing the CPU unit from a support device.

FIG. 9 is a schematic diagram for illustrating processing when accessing CPU unit 100 from a support device 800. Referring to FIG. 9, when accessing CPU unit 100 from support device 800, they are connected, and then the user inputs authentication information (typically, a user name and a password), utilizing support device 800. CPU unit 100 performs authentication processing based on the authentication information from the user. Then, CPU unit 100 returns an authentication result to support device 800. When authentication processing succeeds, CPU unit 100 permits access from support device 800.

On the other hand, when authentication processing fails, there is a possibility of unauthorized access, so it may be determined that a security event occurs. That is, it may be determined that a security event occurs, using a failure in authentication processing when accessing CPU unit 100 from support device 800 as a trigger.

It should be noted that, since a failure in authentication processing may be due to a simple input error, it may be determined that a security event occurs, only when authentication processing when accessing CPU unit 100 from support device 800 continuously fails a plurality of times.

Such monitoring of the authentication result of user authentication when accessing CPU unit 100 from support device 800 is typically achieved by monitoring the CPU unit state information output by state acquisition module 260 shown in FIG. 4.

Thus, the security event in accordance with the present embodiment may include that user authentication required when accessing control device 2 or CPU unit 100 from the outside fails.

(e4-2: User Authentication: Part 2)

Next, a description will be given of an example of monitoring an authentication result of user authentication performed when accessing security unit 200 from the network, as security setting 20.

As shown in FIG. 4 described above, security unit 200 has user authentication module 266, and user authentication is performed when accessing security unit 200 through network 10.

Also when this user authentication fails, it may be determined that a security event occurs, using a failure in authentication processing as a trigger, as in the processing described above. That is, the security event in accordance with the present embodiment may include that user authentication required when accessing control device 2 or CPU unit 100 from the outside fails.

(e4-3: Addition and Update of Program/Change of Setting)

Next, a description will be given of an example of monitoring addition and update of a program to be executed in CPU unit 100 and/or change of setting, as security setting 20.

Figure 10:
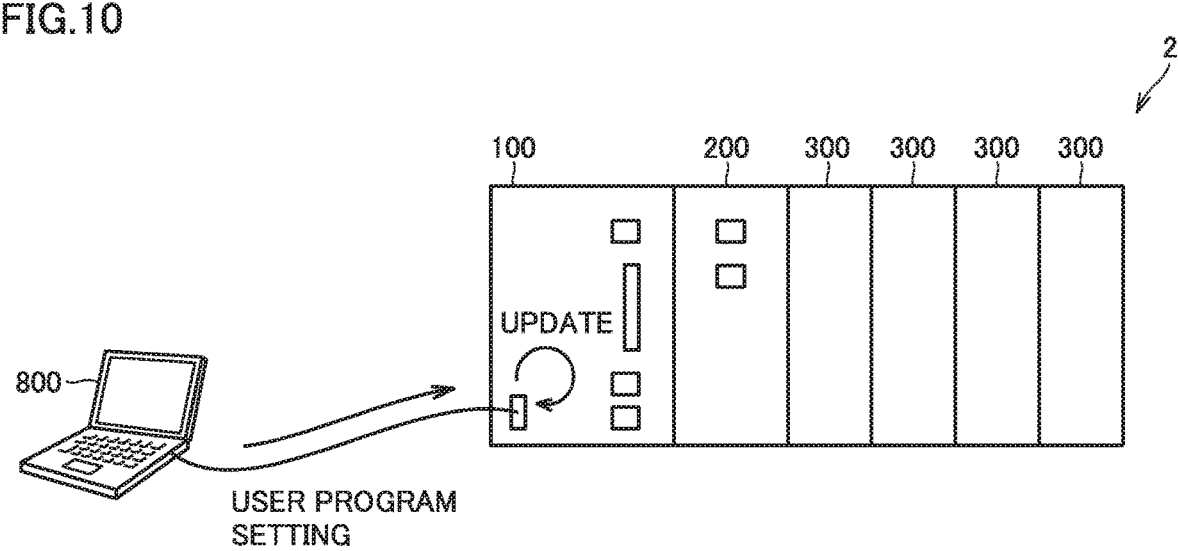
FIG. 10 is a schematic view for illustrating processing for changing a program and/or setting stored in the CPU unit, from the support device.

FIG. 10 is a schematic view for illustrating processing for changing a program and/or setting stored in CPU unit 100, from support device 800. Referring to FIG. 10, the user creates or modifies an arbitrary user program on support device 800, and then transfers the created or modified user program to CPU unit 100. Thereby, the user program is newly installed in CPU unit 100, or the already stored user program is updated.

Alternatively, the user can also change setting held in CPU unit 100 by operating support device 800.

Since such addition of a program to CPU unit 100, update of a program to be executed in CPU unit 100, change of setting in CPU unit 100, and the like change the behavior of CPU unit 100, it may be determined that a security event occurs, using execution of such an operation as a trigger.

Further, support device 800 can clear all working data held in main memory 106 of CPU unit 100. By such all clearing, the program in CPU unit 100 starts to be executed in an initial state. Since such execution from the initial state may exhibit a behavior different from a previous behavior, it may be determined that a security event occurs.

An event such as addition and update of a program and/or change of setting in CPU unit 100 is typically detected by monitoring the CPU unit state information output by state acquisition module 260 shown in FIG. 4. Similarly, an event such as all clearing of main memory 106 of CPU unit 100 is also detected by monitoring the CPU unit state information output by state acquisition module 260 shown in FIG. 4.

Thus, the security event in accordance with the present embodiment may include that any of addition and change of the program to be executed in control device 2 and change of setting in control device 2 occurs. Further, the security event in accordance with the present embodiment may include that an operation such as all clearing of main memory 106 of CPU unit 100 is executed.

F. Notification

Next, some examples of the notification in response to detection of occurrence of a security event will be described.

(f1: Notification Using E-Mail)

First, a description will be given of a configuration in which occurrence of a security event is notified using an e-mail from security unit 200.

Figure 11:
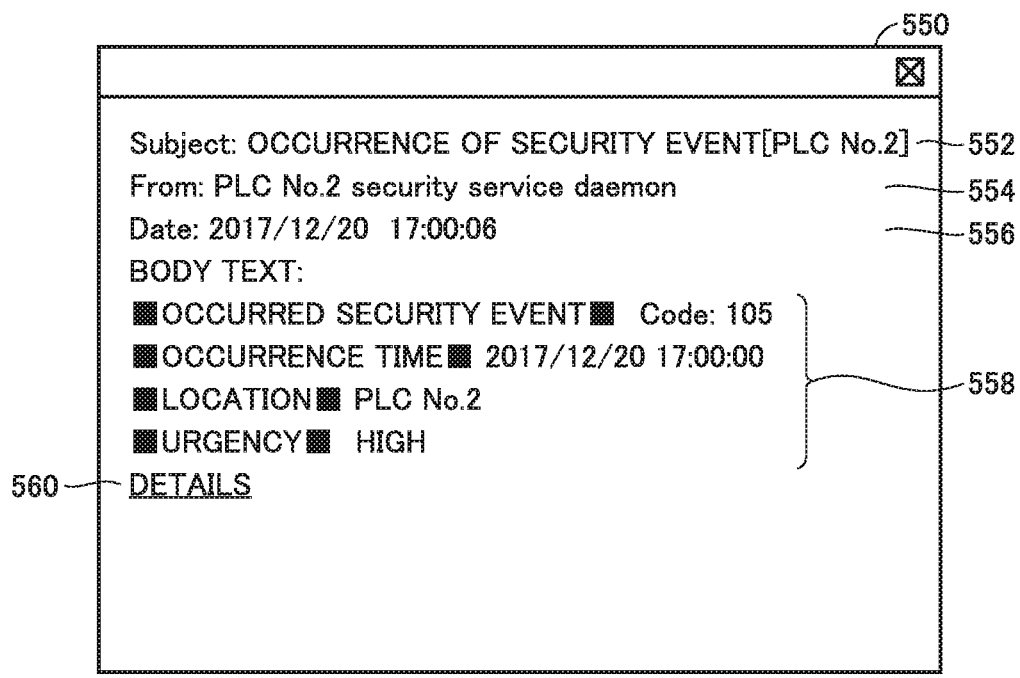
FIG. 11 is a schematic diagram for illustrating an example of an e-mail transmitted from the security unit in accordance with the present embodiment.

FIG. 11 is a schematic diagram for illustrating an example of an e-mail transmitted from security unit 200 in accordance with the present embodiment. Referring to FIG. 11, a display screen 550 of the e-mail includes a subject display column 552, a transmission source display column 554, a reception date and time column 556, and a body text column 558, included in the e-mail from security unit 200.

Subject display column 552 displays a message notifying occurrence of a security event, and information for specifying control device 2 in which the security event occurs. Transmission source display column 554 displays information indicating a service of security unit 200 which is a transmission source of the e-mail. Reception date and time column 556 displays a reception date and time of the e-mail from security unit 200.

Body text column 558 displays information such as a code for specifying the content of the occurred security event, and an occurrence time, an occurrence location, and urgency thereof.

Further, link information 560 for checking the details of the occurred security event may be embedded in body text column 558. The user can acquire detailed information of the occurred security event by selecting link information 560 and thereby accessing security unit 200 which is the transmission source of the e-mail, or an arbitrary server device collecting information from security unit 200.

The content of the e-mail shown in FIG. 11 is exemplary, and an arbitrary content may be notified using an e-mail.

It should be noted that the notified e-mail can be viewed by an arbitrary device. Examples of the arbitrary device include a personal computer, a smart phone, a tablet, and the like.

Thus, when security unit 200 in accordance with the present embodiment detects occurrence of a certain security event, security unit 200 provides a notification about the detected security event to the outside, using means such as an e-mail.

(f2: Notification to Display Device 500)

Next, a description will be given of a configuration in which occurrence of a security event is notified from security unit 200 to display device 500.

Figure 12:
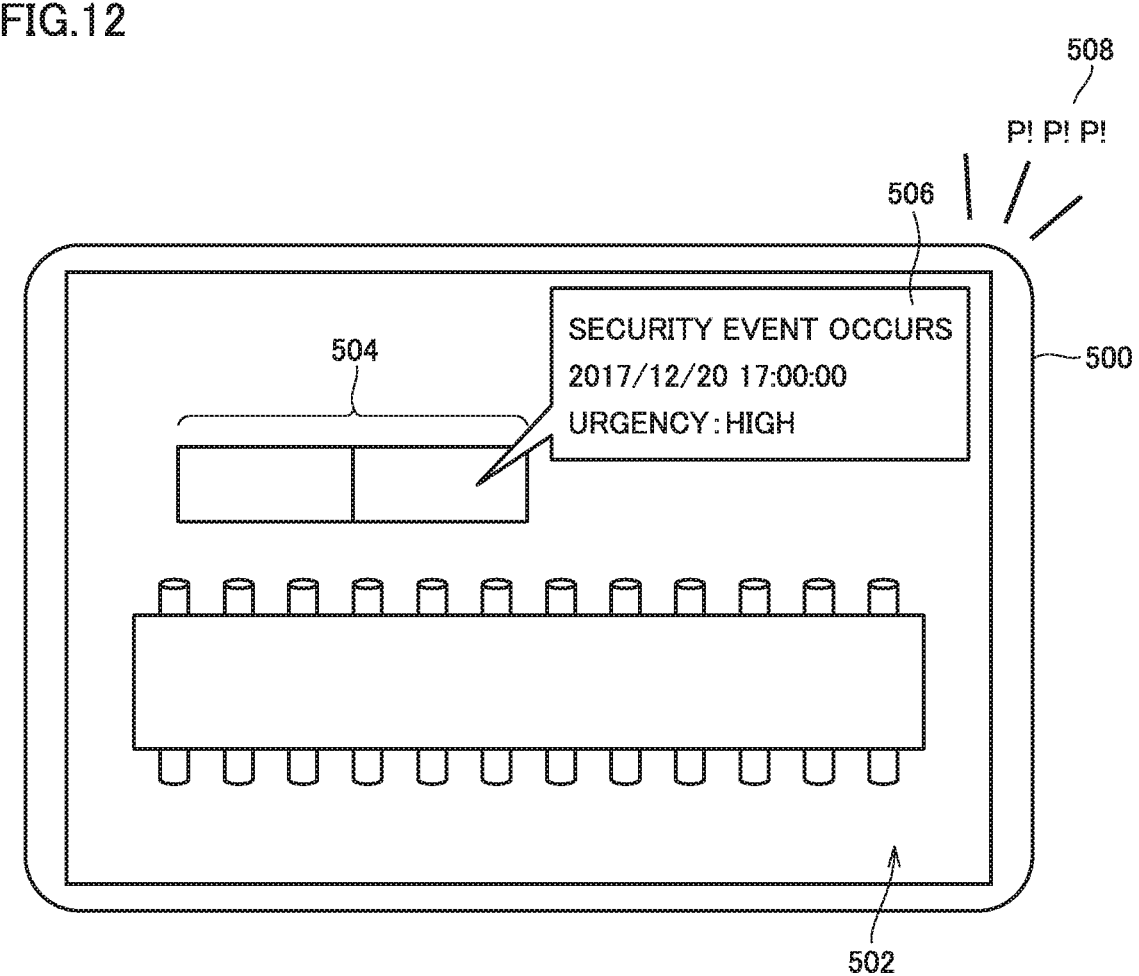
FIG. 12 is a schematic diagram for illustrating an example of a notification about a security event from the security unit to a display device in accordance with the present embodiment.

FIG. 12 is a schematic diagram for illustrating an example of a notification about a security event from security unit 200 to display device 500 in accordance with the present embodiment. Referring to FIG. 12, screen display for operation is provided on a display of display device 500. In the screen display, in addition to an object 502 indicating a control target, an object 504 indicating the control board accommodating control device 2 may be displayed.

When occurrence of a certain security event is detected in a state where such a user interface screen is displayed, an object 506 indicating the content of the notification may be popped up for display at a position corresponding to the control board accommodating control device 2 where the security event occurs.

Object 506 may display a message indicating occurrence of the security event, as well as an occurrence date and time of the security event, urgency thereof, and the like. The display is not limited to the exemplary display in FIG. 12, and more information may be displayed, or conversely, a simpler display content may be provided.

Further, notification sound 508 for notifying occurrence of a security event may be provided from display device 500.

It should be noted that display device 500 as a notification destination is not limited to a display device connected to the same network as that to which security unit 200 is connected. Display device 500 connected to any network may be used as a notification destination, as long as security unit 200 can communicate therewith.

Thus, when security unit 200 in accordance with the present embodiment detects occurrence of a certain security event, security unit 200 provides a notification about the detected security event to a network-connected display device.

(f3: Notification to Database/Cloud Service)

Next, a description will be given of a configuration in which occurrence of a security event is notified from security unit 200 to a database or a cloud service.

Figure 13:
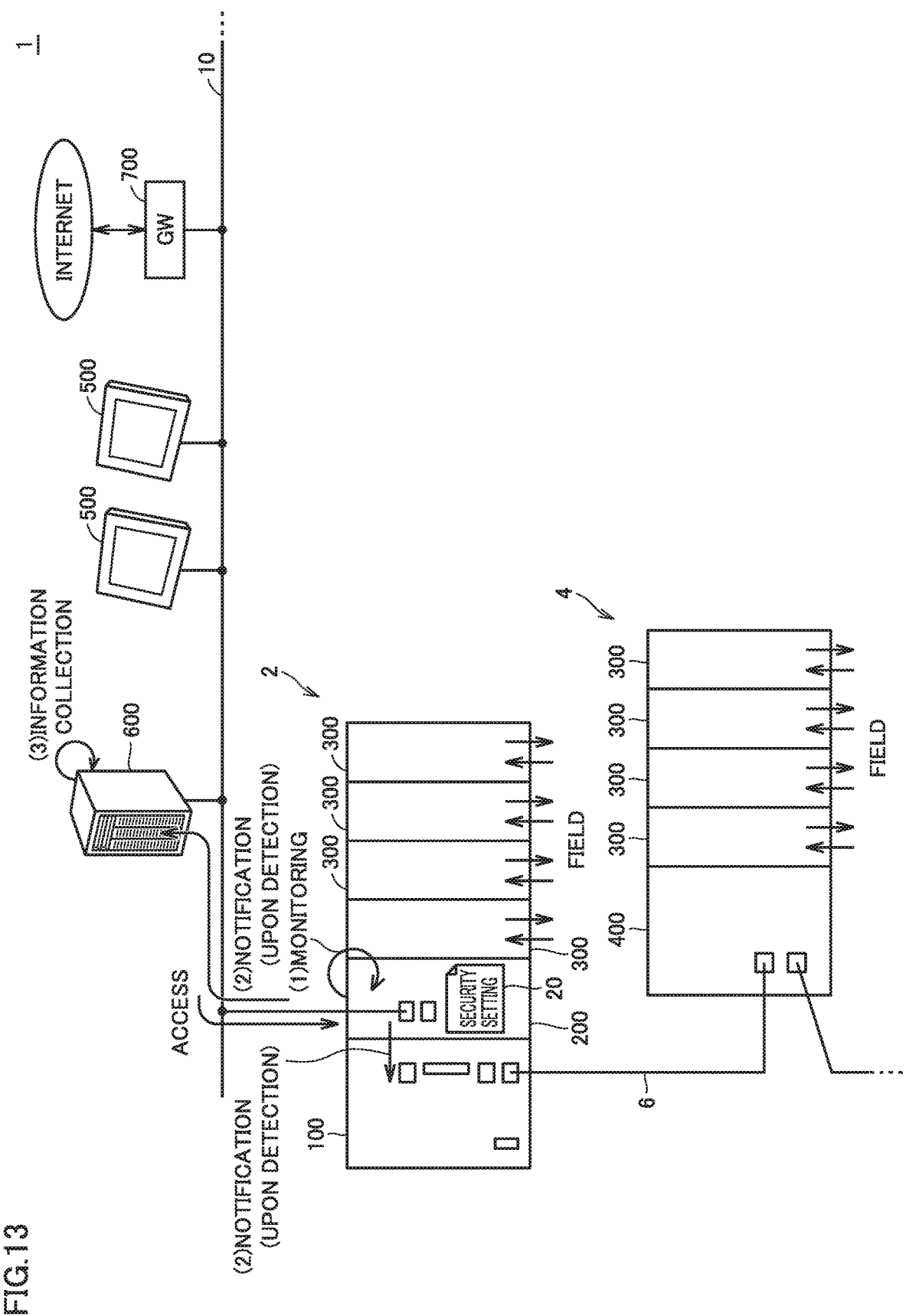
FIG. 13 is a schematic diagram for illustrating an example of providing a notification about a security event from the security unit to a database in accordance with the present embodiment.

FIG. 13 is a schematic diagram for illustrating an example of providing a notification about a security event from security unit 200 to a database in accordance with the present embodiment. Referring to FIG. 13, for example, processing as a database is implemented in server device 600 connected to network 10, and when security unit 200 detects occurrence of a certain security event, security unit 200 provides a notification about the content thereof to server device 600.

Server device 600 sequentially collects the contents of notifications from security unit 200. Then, in response to a request (query) from the outside, server device 600 may return the content of a specified security event.

Although FIG. 13 shows an example where server device 600 connected to network 10 serves as a notification destination, the notification destination is not limited to such server device 600, and a notification about a security event may be provided to an arbitrary server device on the Internet (that is, to a cloud service).

Utilizing the cloud service eliminates the need to prepare server device 600 solely for the purpose of monitoring a security event.

Thus, when security unit 200 in accordance with the present embodiment detects occurrence of a certain security event, security unit 200 provides a notification about the detected security event to a network-connected database/cloud service.

(f4: Notification to Another Control Device)

Next, a description will be given of a configuration in which occurrence of a security event is notified from security unit 200 to another control device.

Figure 14:
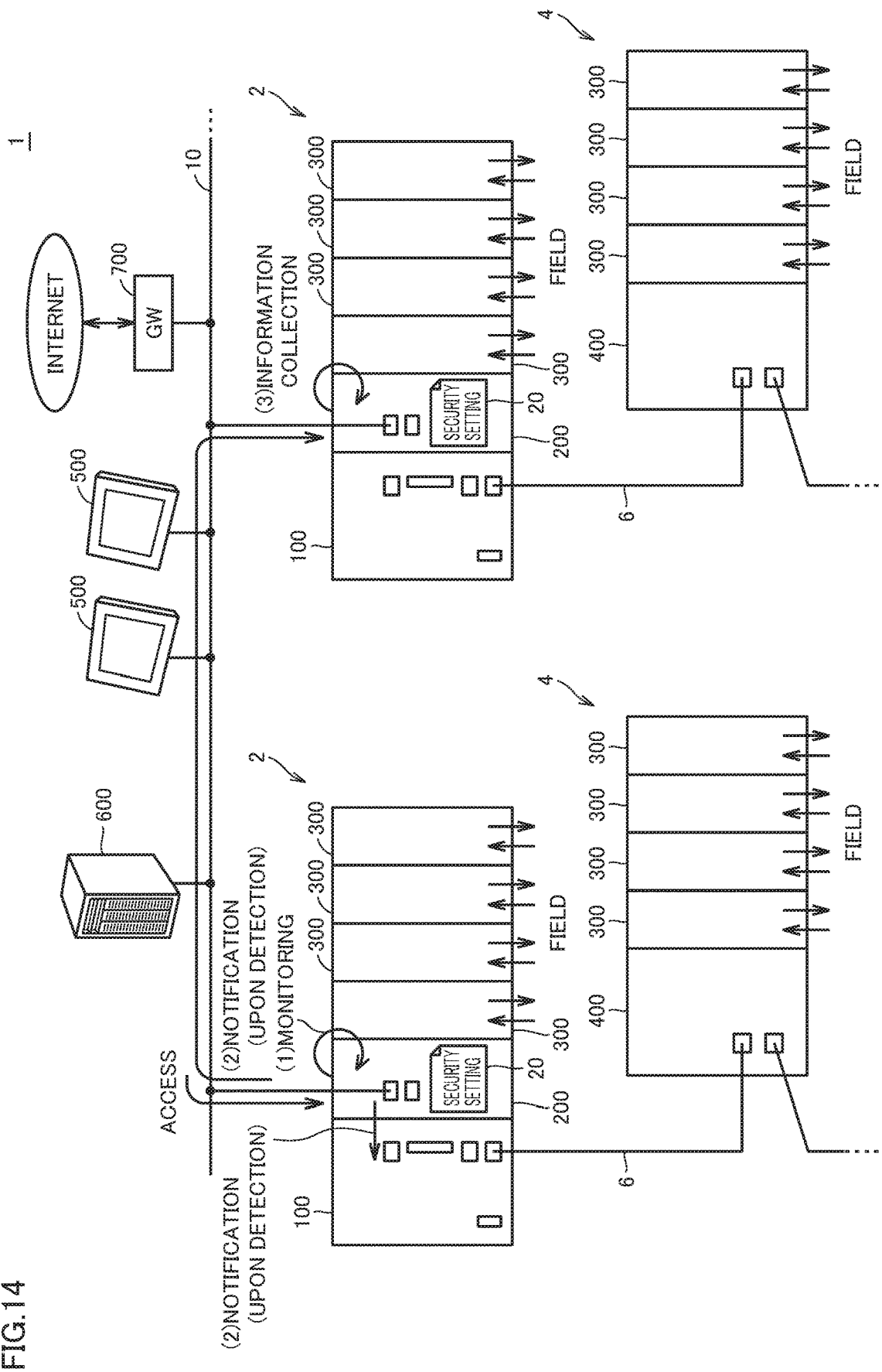
FIG. 14 is a schematic diagram for illustrating an example of providing a notification about a security event from the security unit to another control device in accordance with the present embodiment.

FIG. 14 is a schematic diagram for illustrating an example of providing a notification about a security event from security unit 200 to another control device in accordance with the present embodiment. Referring to FIG. 14, for example, there is assumed a configuration in which a plurality of control devices 2 are connected to the same network 10 and each control device 2 has security unit 200.

When one security unit 200 detects occurrence of a certain security event, that security unit 200 provides a notification about the content of the detected security event to security unit 200 of another control device 2. Security unit 200 receiving notifications from the other security unit 200 sequentially collects the contents of the notifications.

By adopting such a configuration, mutual detection of a security event between security units 200 can be performed.

Further, the other control device 2 receiving the notification about the security event may provide a certain physical alert (such as sound, light, or vibration) in accordance with the urgency of the notification or the like, using a connected field device.

Thus, when security unit 200 in accordance with the present embodiment detects occurrence of a certain security event, security unit 200 provides a notification about the detected security event to the other control device 2 which is network-connected.

(f5: Event Notification)

Next, a description will be given of a configuration in which an event notification about occurrence of a security event is provided from security unit 200 through the network.

Figure 15:
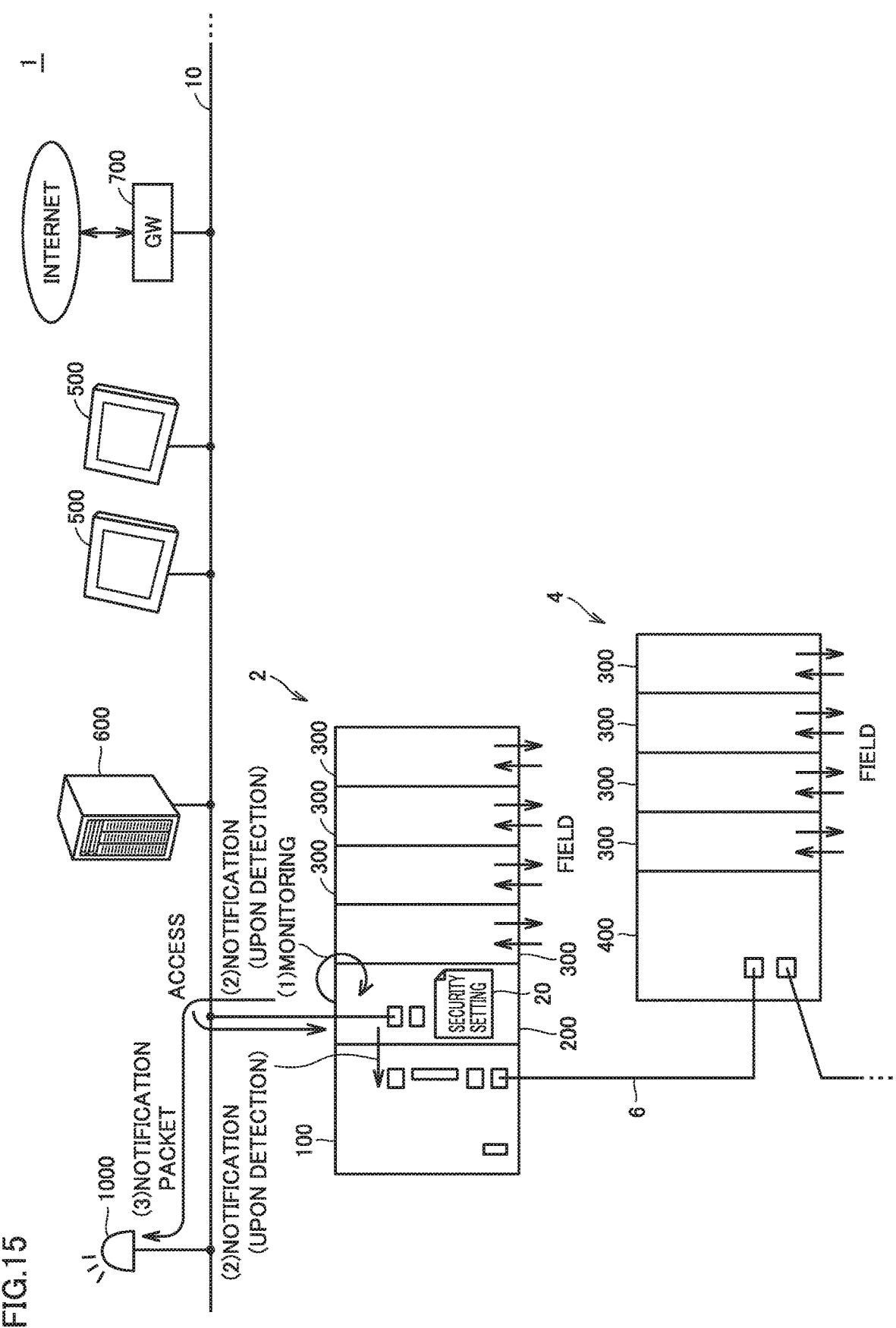
FIG. 15 is a schematic diagram for illustrating an example of providing an event notification from the security unit through the network in accordance with the present embodiment.

FIG. 15 is a schematic diagram for illustrating an example of providing an event notification from security unit 200 through the network in accordance with the present embodiment. Referring to FIG. 15, there is assumed a configuration in which an alert unit 1000 for providing an alert about occurrence of a security event is arranged on network 10.

When security unit 200 detects occurrence of a certain security event, security unit 200 sends a notification packet to alert unit 1000 through network 10. When alert unit 1000 receives the notification packet from security unit 200, alert unit 1000 starts a physical alert (such as sound, light, or vibration) in accordance with the content of the notification packet.

As the notification packet, for example, a simple network management protocol (SNMP) trap or the like can be utilized. In addition to an SNMP trap, any protocol may be adopted, as long as it can provide an event notification.

By adopting such a configuration, the alert unit arranged at any position on the network can be notified of occurrence of a security event.

Thus, when security unit 200 in accordance with the present embodiment detects occurrence of a certain security event, security unit 200 may provide an event notification about the detected security event through the network. Upon receiving such an event notification, alert unit 1000 arranged on the network may start alert operation.

(f6: Display of Urgency/Priority)

As described above, in control system 1 in accordance with the present embodiment, one or a plurality of state values or events is/are monitored to determine whether a security event occurs. Generally, each security event has urgency and/or priority in accordance with each event, and the security events do not necessarily have the same urgency and/or priority.

Thus, urgency and/or priority may be set beforehand for each security event to be monitored, and when occurrence of a certain security event is detected, the urgency and/or priority of the detected security event may also be notified.

As a method for notifying such urgency and/or priority, text information as shown in FIGS. 11 and 12 described above may be used. Alternatively, when alert unit 1000 as shown in FIG. 15 is used, urgency and/or priority may be notified by changing a color, a lighting pattern, a sound tone, a sound volume, or the like provided by alert unit 1000.

By providing a notification about the urgency and/or priority of the detected security event, the user who receives the notification can immediately understand with what degree of urgency and/or priority the user should handle the detected security event.

G. Processing Procedure

Next, a description will be given of an example of a processing procedure for monitoring a security event in security unit 200 in accordance with the present embodiment.

Figure 16:
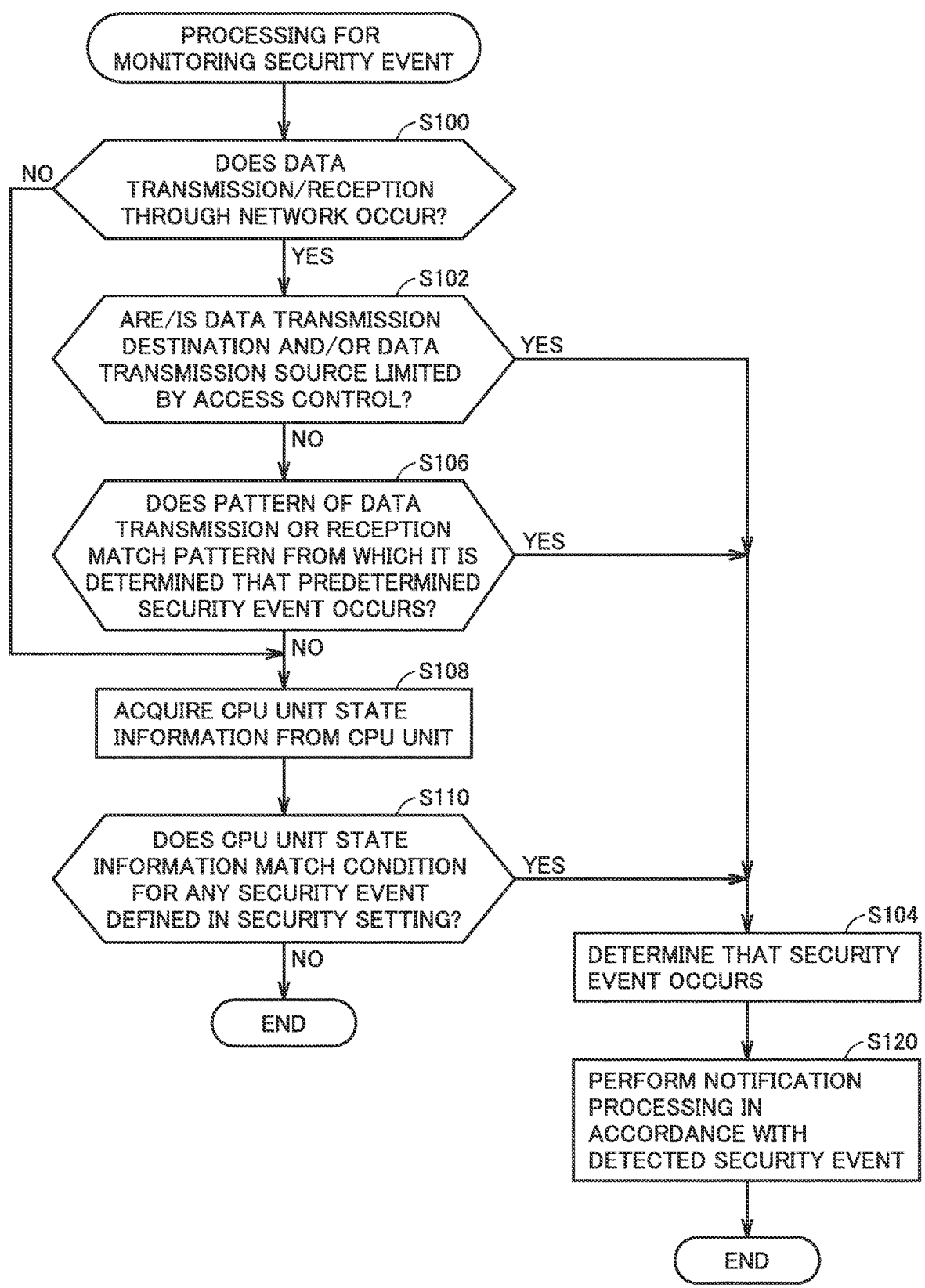
FIG. 16 is a flowchart showing a processing procedure for monitoring a security event in the security unit in accordance with the present embodiment.

FIG. 16 is a flowchart showing a processing procedure for monitoring a security event in security unit 200 in accordance with the present embodiment. Each step shown in FIG. 16 is typically achieved by processor 202 of security unit 200 executing firmware 22. The processing procedure shown in FIG. 16 is repeatedly performed for each predetermined cycle, or is performed each time a predetermined event occurs.

Referring to FIG. 16, security unit 200 determines whether data transmission/reception through network 10 occurs (step S100). When data transmission/reception through network 10 does not occur (NO in step S100), processing in steps S102 to S106 is skipped.

When data transmission/reception through network 10 occurs (YES in step S100), security unit 200 determines whether a data transmission destination and/or a data transmission source are/is limited by access control (step S102). When the data transmission destination and/or the data transmission source are/is limited by access control (YES in step S102), security unit 200 determines that a security event occurs (step S104). Then, notification processing defined in step S120 is performed.

When the data transmission destination and/or the data transmission source are/is not limited by access control (NO in step S102), security unit 200 determines whether a pattern of data transmission or reception matches a pattern from which it is determined that a predetermined security event occurs (step S106). When the pattern of data transmission or reception matches the pattern from which it is determined that a predetermined security event occurs (YES in step S106), security unit 200 determines that a security event occurs (step S104). Then, notification processing defined in step S120 is performed.

Subsequently, security unit 200 acquires the CPU unit state information from CPU unit 100 (step S108), and determines whether the acquired CPU unit state information matches a condition for any security event defined in security setting 20 (step S110). When the acquired CPU unit state information matches the condition for any security event (YES in step S110), security unit 200 determines that a security event occurs (step S104). Then, notification processing defined in step S120 is performed.

When the acquired CPU unit state information does not match the condition for any security event (NO in step S110), processing ends.

In step S120, security unit 200 performs notification processing in accordance with the detected security event. Then, processing ends.

H. Variation (h1: Integral Type)

In control system 1 in accordance with the present embodiment described above, the configuration of connecting security unit 200 to CPU unit 100 is illustrated. However, instead of such a separate-type configuration, a configuration in which the both units are integrated with each other may be adopted. In this case, a configuration of software implementation and/or hardware implementation for achieving processing provided by security unit 200 is arranged within CPU unit 100.

By adopting such an integral-type configuration, space-saving of the entire control system can be achieved.

(h2: Externally Attached Type)

In control system 1 in accordance with the present embodiment described above, the configuration of establishing network connection utilizing a network port of security unit 200 instead of the network port of CPU unit 100 is illustrated. However, when the processing for monitoring a security event in accordance with the present embodiment is applied to an existing control device, an externally attached-type security unit may be adopted.

Figure 17:
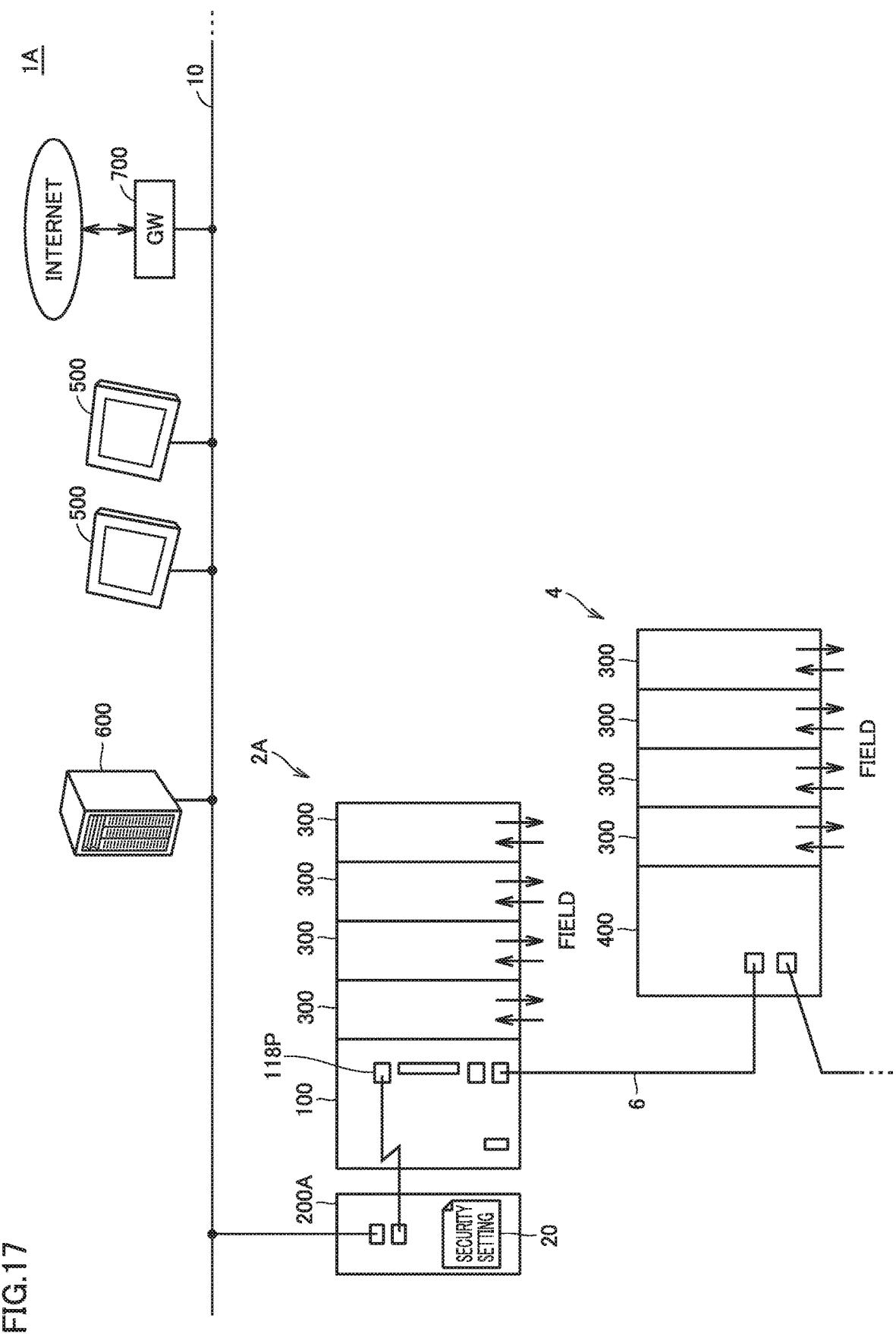
FIG. 17 is a schematic diagram showing a schematic configuration of a control system in accordance with a variation of the present embodiment.

FIG. 17 is a schematic diagram showing a schematic configuration of a control system 1A in accordance with a variation of the present embodiment. Referring to FIG. 17, in control system 1A, a control device 2A includes CPU unit 100 and one or a plurality of functional units 300. A security unit 200A is arranged to mediate between network 10 and control device 2A.

More specifically, security unit 200A has two network ports, one network port being connected to network 10, and the other network port being connected to network port 118P of CPU unit 100 included in control device 2A. In such a configuration, CPU unit 100 performs data communication with devices connected to network 10, through security unit 200A.

Security unit 200A can constantly monitor whether a security event occurs, by monitoring data sent from CPU unit 100 and data received by CPU unit 100.

Security unit 200A may further be connected to CPU unit 100 through another data transmission means. By adopting such other data transmission means, security unit 200A can acquire the CPU unit state information of CPU unit 100. Based on such CPU unit state information, security unit 200A can also constantly monitor occurrence of a security event caused by direct access to CPU unit 100.

(h3: Others)

The security unit in accordance with the present embodiment may be implemented in any configuration, as long as it can monitor occurrence of a security event in CPU unit 100 and control device 2 including CPU unit 100.

I. Supplementary Notes

The present embodiment as described above includes the following technical ideas.

[Configuration 1]

A control device (2) that controls a control target, the control device comprising:

a program execution module (102) that executes a program created depending on the control target;

a detection module (262) that determines whether a security event occurs in access from outside to the control device; and a notification module (264) that provides a notification, upon detection of occurrence of the security event, to a notification destination corresponding to the occurred security event, the security event including an event that does not conform to a predetermined rule.

[Configuration 2]

The control device according to configuration 1, wherein the security event includes any of a behavior and an action that halt operation of the control device and/or degrade performance of the control device, a behavior and an action that halt processing for executing the program and/or degrade performance of the program in the control device, and a behavior and an action that halt operation of the control target and/or degrade performance of the control target.

[Configuration 3]

The control device according to configuration 1 or 2, wherein the security event includes that any of a network address, a physical address, and a port number of a data transmission destination and/or a data transmission source is not included in a predetermined list for permitted access, or is included in a predetermined list for prohibited access.

[Configuration 4]

The control device according to any one of configurations 1 to 3, wherein the control device comprises a first unit (100) including the program execution module, and a second unit (200) including the detection module, the first unit has a port (118P) for network connection, and the security event includes that, when the port of the first unit is disabled, the port is network-connected.

[Configuration 5]

The control device according to any one of configurations 1 to 4, wherein the security event includes that user authentication required when accessing the control device from the outside fails.

[Configuration 6]

The control device according to any one of configurations 1 to 5, wherein the security event includes that a support device capable of developing the program to be executed in the control device is connected to the control device.

[Configuration 7]

The control device according to any one of configurations 1 to 6, wherein the security event includes that any of addition and change of the program to be executed in the control device and change of setting in the control device occurs.

[Configuration 8]

The control device according to any one of configurations 1 to 7, wherein the notification module provides an event notification about occurrence of the security event through a network.

[Configuration 9]

The control device according to configuration 8, wherein an alert unit (1000) arranged on the network starts alert operation upon receiving the event notification from the notification module.

[Configuration 10]

A control system (1) that controls a control target, the control system comprising:

a first unit (100) including a program execution module that executes a program created depending on the control target; and a second unit (200) including a detection module (262) that determines whether a security event occurs in access from outside to the first unit, and a notification module (264) that provides a notification, upon detection of occurrence of the security event, to a notification destination corresponding to the occurred security event, the security event including an event that does not conform to a predetermined rule.

J. Conclusion

The control device and the control system in accordance with the present embodiment can solve a new problem of protection against a threat which may occur with the advance of networking of or incorporation of intelligence into the control device and the control system.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

REFERENCE SIGNS LIST 1, 1A: control system; 2, 2A: control device; 4: remote IO device; 6: field network; 10: network; 20: security setting; 22: firmware; 24: history information; 30: user program; 32: system program; 100: CPU unit; 102, 202: processor; 104, 204: chipset; 106, 206: main memory; 108, 208: storage; 110, 210: inter-unit interface; 112: USB interface; 112P: USB port; 114: memory card interface; 114P: memory card slot; 116: memory card; 118, 220: network interface; 118P: network port; 120: internal bus controller; 130: field network controller; 130P1, 130P2: field network port; 200, 200A: security unit; 222: transmission/reception portion; 224: controller; 226: buffer; 250: frame extraction module; 252: analysis module; 254: content analysis processing; 256: feature extraction processing; 258: statistical processing; 260: state acquisition module; 262: detection module; 264: notification module; 266: user authentication module; 300: functional unit; 400: coupler unit; 500: display device; 502, 504, 506: object; 508: notification sound; 550: display screen; 552: subject display column; 554: transmission source display column; 556: reception date and time column; 558: body text column; 560: link information; 600: server device; 700: gateway; 800: support device; 900: device; 1000: alert unit.

The invention claimed is:

1. A control device that controls a control target, the control device comprising a hardware processor coupled to a port and configured to perform operations comprising:
   executing a program created depending on the control target; and
   determining whether a security event occurs by access from outside to the control device; and providing a notification, upon detection of the occurrence of the security event, to a notification destination corresponding to the occurred security event, wherein
   the port is configured to be capable of network connection,
   the security event comprises an event in which, when a state of the port is disabled and use of the port for network connection is prohibited, a network connection to the port from outside the control device is detected to occur.

2. The control device according to claim 1, wherein the security event includes any of
   a behavior and an action that halt operation of the control device and/or degrade performance of the control device,
   a behavior and an action that halt processing for executing the program and/or degrade performance of the program in the control device, and
   a behavior and an action that halt operation of the control target and/or degrade performance of the control target.

3. The control device according to claim 1, wherein the security event includes that any of a network address, a physical address, and a port number of a data transmission destination and/or a data transmission source is not included in a predetermined list for permitted access, or is included in a predetermined list for prohibited access.

4. The control device according to claim 1, wherein the security event includes that user authentication required when accessing the control device from the outside fails.

5. The control device according to claim 1, wherein the security event includes that any of addition and change of the program to be executed in the control device and change of setting in the control device occurs.

6. The control device according to claim 1, wherein the notification module provides an event notification about the occurrence of the security event through a network.

7. The control device according to claim 6, wherein an alert unit arranged on the network starts alert operation upon receiving the event notification from the notification.

8. A control device that controls a control target, the control device comprising a hardware processor configured to perform operations comprising:
   executing a program created depending on the control target;
   determining whether a security event occurs by access from outside to the control device; and
   providing a notification, upon detection of the occurrence of the security event, to a notification destination corresponding to the occurred security event, wherein
   the security event comprises an event in which a support device capable of developing the program to be executed in the control device is determined to be connected to the control device during operation thereof.

9. The control device according to claim 8, wherein the security event includes any of
   a behavior and an action that halt operation of the control device and/or degrade performance of the control device, a behavior and an action that halt processing for executing the program and/or degrade performance of the program in the control device, and a behavior and an action that halt operation of the control target and/or degrade performance of the control target.

10. The control device according to claim 8, wherein the security event includes that any of a network address, a physical address, and a port number of a data transmission destination and/or a data transmission source is not included in a predetermined list for permitted access, or is included in a predetermined list for prohibited access.

11. The control device according to claim 8, wherein the security event includes that user authentication required when accessing the control device from the outside fails.

12. The control device according to claim 8, wherein the security event includes that any of addition and change of the program to be executed in the control device and change of setting in the control device occurs.

13. The control device according to claim 8, wherein the notification provides an event notification about the occurrence of the security event through a network.

14. The control device according to claim 13, wherein an alert unit arranged on the network starts alert operation upon receiving the event notification from the notification.

15. A control system that controls a control target, the control system comprising a hardware processor coupled to a port and configured to perform operations comprising:

executing a program created depending on the control target; and determining whether a security event occurs by access from outside, and providing a notification, upon detection of the occurrence of the security event, to a notification destination corresponding to the occurred security event, wherein the port is configured to be capable of network connection, and the security event comprises an event in which, when a state of the port is disabled and use of the port for network connection is prohibited, a network connection to the port from outside the control system is detected to occur.

16. A control system that controls a control target, the control system comprising a hardware processor configured to perform operations comprising:

executing a program created depending on the control target;

determining whether a security event occurs by access from outside, and providing a notification, upon detection of the occurrence of the security event, to a notification destination corresponding to the occurred security event, wherein the security event comprises an event in which a support device capable of developing the program to be executed in the control system is determined to be connected to the control system during operation thereof.

* * * * *